United States Patent
Miwa et al.

(10) Patent No.: US 11,936,043 B2
(45) Date of Patent: Mar. 19, 2024

(54) METHOD FOR MANUFACTURING POSITIVE ELECTRODE ACTIVE MATERIAL, AND LITHIUM ION BATTERY

(71) Applicant: SEMICONDUCTOR ENERGY LABORATORY CO., LTD., Atsugi (JP)

(72) Inventors: Takuya Miwa, Mie (JP); Yumiko Yoneda, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 450 days.

(21) Appl. No.: 17/224,229

(22) Filed: Apr. 7, 2021

(65) Prior Publication Data

US 2021/0226216 A1    Jul. 22, 2021

Related U.S. Application Data

(63) Continuation of application No. 16/893,726, filed on Jun. 5, 2020, now Pat. No. 10,985,369, which is a continuation of application No. 15/586,341, filed on May 4, 2017, now Pat. No. 10,680,242.

(30) Foreign Application Priority Data

May 18, 2016  (JP) ................................ 2016-099458

(51) Int. Cl.
*H01M 4/58* (2010.01)
*C01B 25/45* (2006.01)
*H01M 4/02* (2006.01)
*H01M 10/0525* (2010.01)

(52) U.S. Cl.
CPC ........... *H01M 4/5825* (2013.01); *C01B 25/45* (2013.01); *C01P 2002/72* (2013.01); *C01P 2004/03* (2013.01); *C01P 2004/62* (2013.01); *C01P 2004/64* (2013.01); *C01P 2006/40* (2013.01); *H01M 2004/028* (2013.01); *H01M 10/0525* (2013.01)

(58) Field of Classification Search
CPC ........... H01M 4/5825; H01M 10/0525; H01M 2004/028; C01B 25/45; C01P 2002/72; C01P 2004/03; C01P 2004/62; C01P 2004/64; C01P 2006/40

See application file for complete search history.

(56) References Cited

U.S. PATENT DOCUMENTS

| | | |
|---|---|---|
| 8,053,075 B2 | 11/2011 | Schall et al. |
| 8,470,477 B2 | 6/2013 | Miwa et al. |
| 8,501,011 B2 | 8/2013 | Felch |
| 8,685,570 B2 | 4/2014 | Miwa et al. |
| 8,945,498 B2 | 2/2015 | Futamura |
| 9,059,478 B2 | 6/2015 | Yamazaki et al. |
| 9,118,077 B2 | 8/2015 | Miwa et al. |
| 9,216,907 B2 | 12/2015 | Nakano et al. |
| 9,249,524 B2 | 2/2016 | Miwa et al. |
| 9,252,419 B2 | 2/2016 | Miwa et al. |
| 9,315,401 B2 | 4/2016 | Felch |
| 9,373,834 B2 | 6/2016 | Yamakaji et al. |
| 9,543,573 B2 | 1/2017 | Kintaka |
| 9,556,536 B2 | 1/2017 | Miwa et al. |
| 9,627,686 B2 | 4/2017 | Futamura |
| 9,711,292 B2 | 7/2017 | Miwa et al. |
| 9,935,313 B2 | 4/2018 | Miwa et al. |
| 10,096,428 B2 | 10/2018 | Miwa et al. |
| 10,205,160 B2 | 2/2019 | Yamazaki et al. |
| 10,680,242 B2 * | 6/2020 | Miwa .................. H01M 4/5825 |
| 10,985,369 B2 * | 4/2021 | Miwa .................. H01M 4/5825 |
| 11,101,460 B2 | 8/2021 | Yamazaki et al. |
| 2011/0031105 A1 | 2/2011 | Miyanaga |

(Continued)

FOREIGN PATENT DOCUMENTS

| | | |
|---|---|---|
| CN | 101155756 A | 4/2008 |
| CN | 102044666 A | 5/2011 |

(Continued)

OTHER PUBLICATIONS

Chinese Office Action (Application No. 201710355017.2) dated Jun. 3, 2021.
Borong W. et al., "LiFePO4 Cathode Material", Electric Vehicles The Benefits and Barriers, 2011, pp. 199-216.
Chinese Office Action (Application No. 202210299290.9) dated Dec. 7, 2023.

*Primary Examiner* — Timothy C Vanoy
(74) *Attorney, Agent, or Firm* — NIXON PEABODY LLP; Jeffrey L. Costellia

(57) ABSTRACT

A composite oxide with high diffusion rate of lithium is provided. Alternatively, a lithium-containing complex phosphate with high diffusion rate of lithium is provided. Alternatively, a positive electrode active material with high diffusion rate of lithium is provided. Alternatively, a lithium ion battery with high output is provided. Alternatively, a lithium ion battery that can be manufactured at low cost is provided. A positive electrode active material is formed through a first step of mixing a lithium compound, a phosphorus compound, and water, a second step of adjusting pH by adding a first aqueous solution to a first mixed solution formed in the first step, a third step of mixing an iron compound with a second mixed solution formed in the second step, a fourth step of performing heat treatment under a pressure more than or equal to 0.1 MPa and less than or equal to 2 MPa at a highest temperature more than 100° C. and less than or equal to 119° C. on a third mixed solution formed in the third step with a pH of more than or equal to 3.5 and less than or equal to 5.0.

14 Claims, 39 Drawing Sheets

(56) References Cited

U.S. PATENT DOCUMENTS

| | | |
|---|---|---|
| 2012/0237426 A1 | 9/2012 | Futamura |
| 2013/0065120 A1 | 3/2013 | Miwa et al. |
| 2014/0295281 A1 | 10/2014 | Gutel et al. |
| 2015/0099159 A1 | 4/2015 | Hoshina et al. |
| 2015/0125751 A1 | 5/2015 | Futamura |
| 2016/0079600 A1 | 3/2016 | Miwa et al. |
| 2016/0322630 A1 | 11/2016 | Oyama et al. |
| 2017/0256785 A1 | 9/2017 | Oguni et al. |

FOREIGN PATENT DOCUMENTS

| | | | | |
|---|---|---|---|---|
| CN | 103000862 A | 3/2013 | | |
| CN | 103079998 A | 5/2013 | | |
| CN | 103 137 964 A | * 6/2013 | .......... | H01M 4/5825 |
| CN | 103165859 A | 6/2013 | | |
| CN | 103443971 A | 12/2013 | | |
| CN | 103765641 A | 4/2014 | | |
| EP | 2413402 A | 2/2012 | | |
| JP | 2004-095385 A | 3/2004 | | |
| JP | 2008-066019 A | 3/2008 | | |
| JP | 2009-301813 A | 12/2009 | | |
| JP | 2010-168230 A | 8/2010 | | |
| JP | 2010-251302 A | 11/2010 | | |
| JP | 2011-071018 A | 4/2011 | | |
| JP | 2011-181452 A | 9/2011 | | |
| JP | 2012-211072 A | 11/2012 | | |
| JP | 2013-054922 A | 3/2013 | | |
| JP | 2013-065551 A | 4/2013 | | |
| JP | 2014-179176 A | 9/2014 | | |
| JP | 2017-212208 A | 11/2017 | | |
| WO | WO-2008/091578 | 7/2008 | | |
| WO | WO-2012/132307 | 10/2012 | | |
| WO | WO-2013/031929 | 3/2013 | | |

* cited by examiner

FIG. 18A
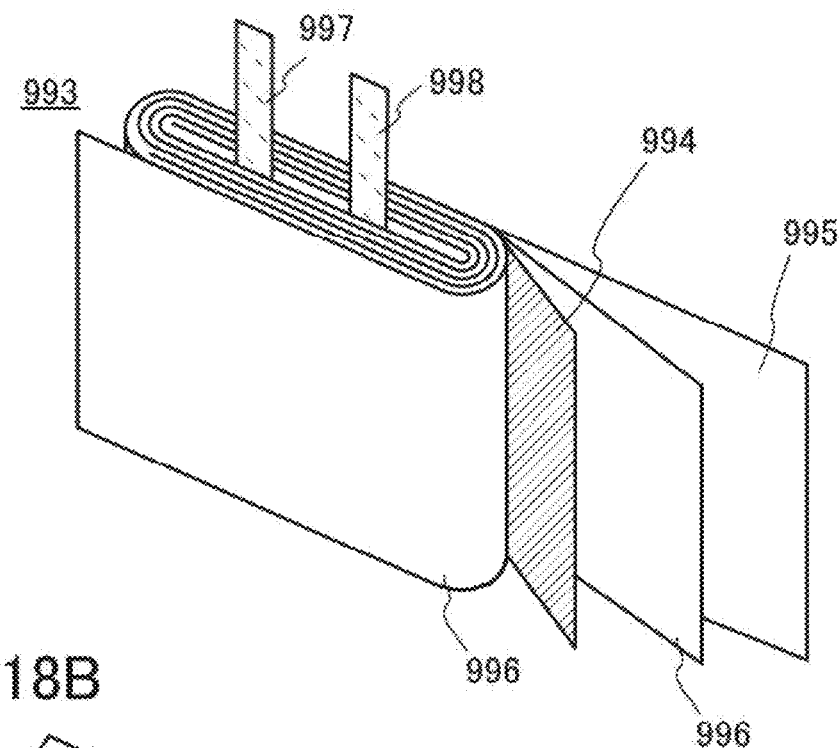
FIG. 18B
FIG. 18C
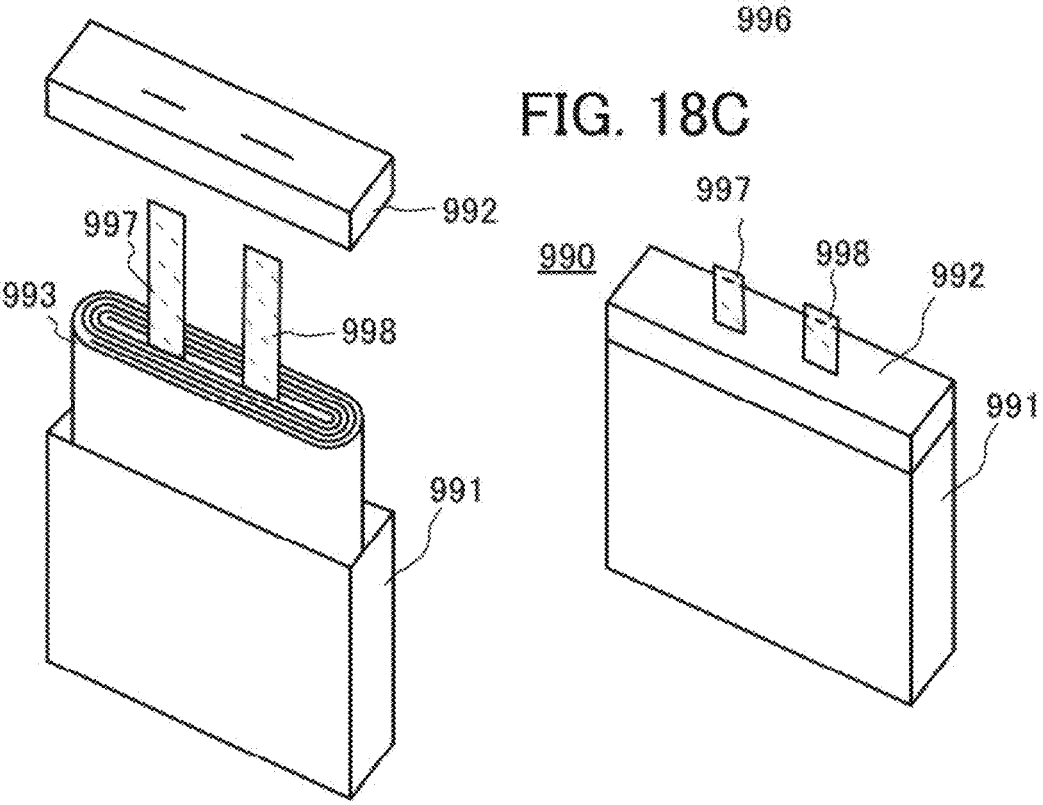

FIG. 20A1
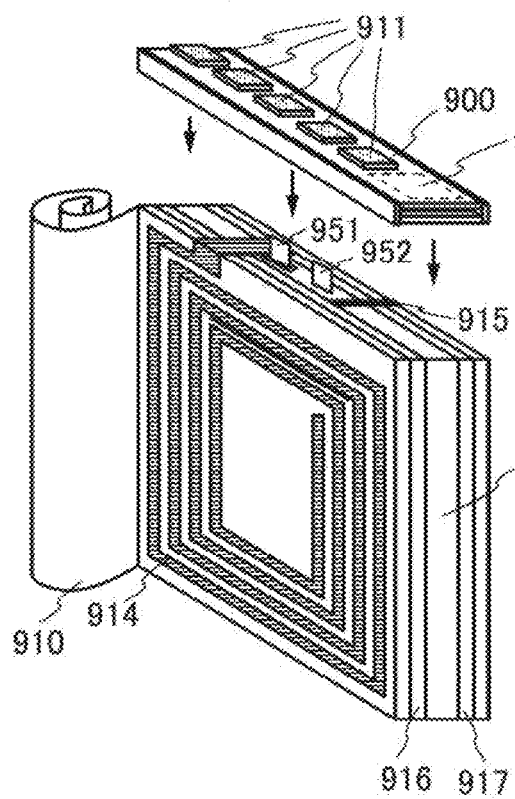
FIG. 20A2
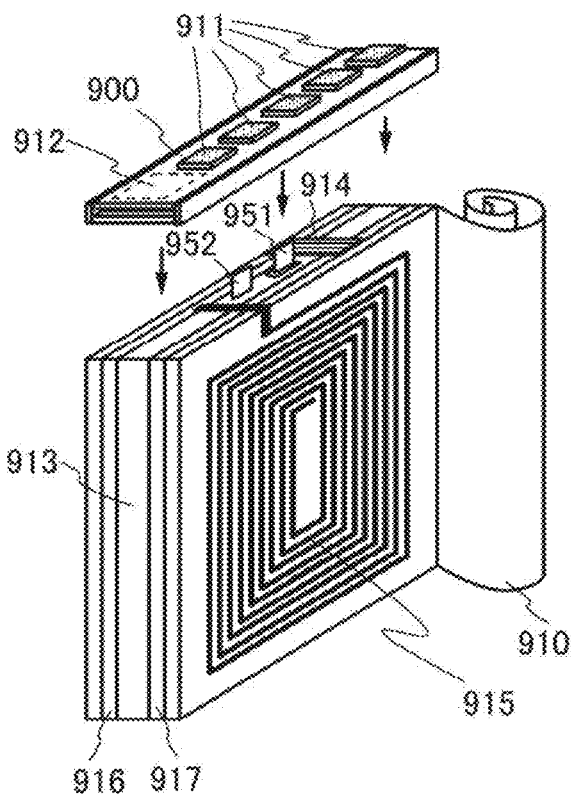
FIG. 20B1
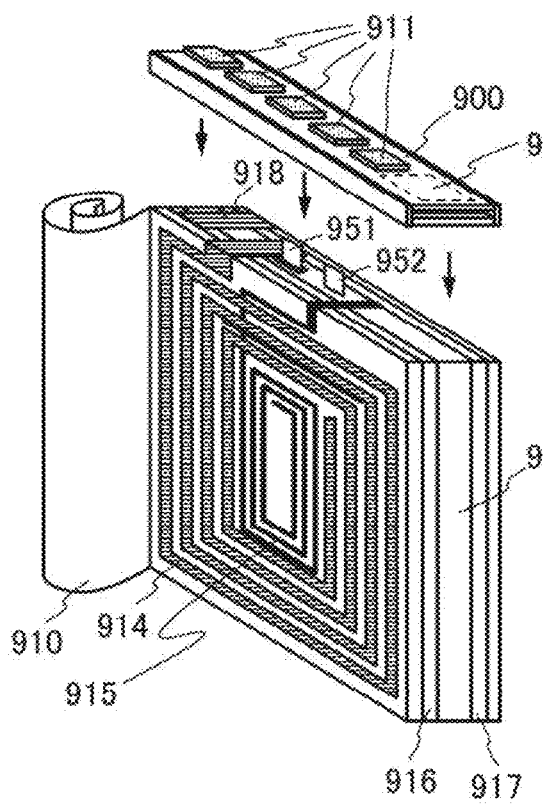
FIG. 20B2
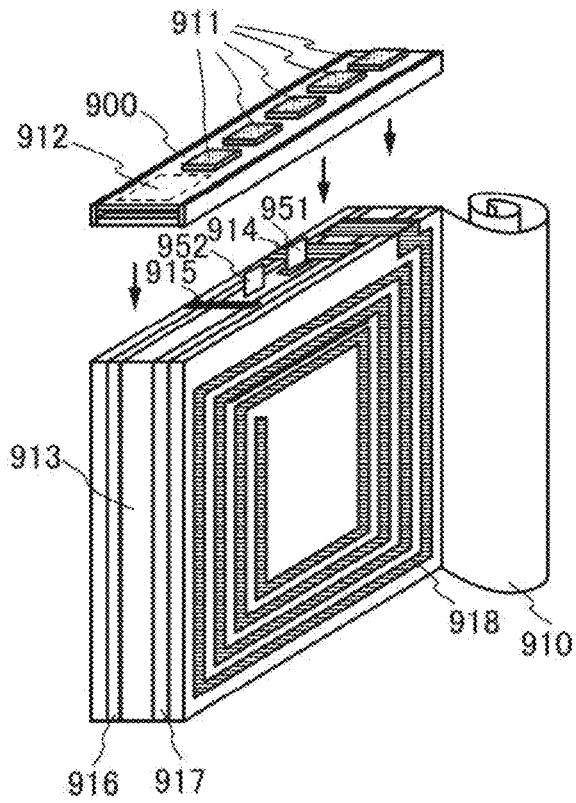

METHOD FOR MANUFACTURING POSITIVE ELECTRODE ACTIVE MATERIAL, AND LITHIUM ION BATTERY

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a memory device, a driving method thereof, a manufacturing method thereof, or an evaluation method thereof. In particular, one embodiment of the present invention relates to a power storage device, a manufacturing method thereof and an evaluation method thereof. Alternatively, the present invention relates to a lithium-containing complex phosphate and a manufacturing method thereof. Alternatively, the present invention relates to a positive electrode active material and a manufacturing method thereof. Alternatively, the present invention relates to a lithium ion battery. Alternatively, the present invention relates to a battery management unit and an electronic device.

2. Description of the Related Art

The solubility in a solution at high temperature and under high pressure is higher than at normal temperature and under normal pressure. Further, by controlling pH of the solution, the dissolution and precipitation of a material can be controlled (Patent Document 1). As an example of a reaction at high temperature and under high pressure, a hydrothermal method can be raised.

In recent years, power storage devices such as lithium ion secondary batteries have been developed. Examples of such power storage devices include a power storage device having an electrode formed using lithium iron phosphate (LiFePO$_4$), which is a composite oxide, as an active material. The power storage device having an electrode formed using LiFePO$_4$ has high thermal stability and favorable cycle characteristics.

As an example of a method for generating a composite oxide such as LiFePO$_4$, the hydrothermal method can be used (e.g., Patent Document 2).

By using the hydrothermal method, even a material which is less likely to be dissolved in water at normal temperatures and under normal pressures can be dissolved, and thus a substance which is hardly obtained by a production method performed at normal temperatures and under normal pressures can be synthesized or crystal growth of such a substance can be conducted. Further, by using the hydrothermal method, microparticles of single crystals of a target substance can be easily synthesized.

The hydrothermal method, for example, enables a desired compound to be generated in the following manner a solution containing a raw material is introduced into a container resistant to pressure and be subjected to pressure treatment and heat treatment; and the treated solution is filtered.

REFERENCES

[Patent Document 1] PCT International Publication No. 2008/091578

[Patent Document 2] Japanese Published Patent Application No. 2004-95385

SUMMARY OF THE INVENTION

An object of one embodiment of the present invention is to provide a composite oxide with high diffusion rate of lithium. Another object of one embodiment of the present invention is to provide a lithium-containing complex phosphate with high diffusion rate of lithium. Another object of one embodiment of the present invention is to provide a positive electrode active material with high diffusion rate of lithium. Another object of one embodiment of the present invention is to provide a lithium ion battery with high output. Another object of one embodiment of the present invention is to provide a lithium ion battery that can be manufactured at low cost. Another object of one embodiment of the present invention is to provide a novel battery.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a method for manufacturing a positive electrode active material including lithium, phosphorus, iron, and oxygen, including a first step of mixing a lithium compound, a phosphorus compound, and water, a second step of adjusting pH by adding a first aqueous solution to a first mixed solution formed in the first step, a third step of mixing an iron compound with a second mixed solution formed in the second step, and a fourth step of performing heat treatment under a pressure more than or equal to 0.1 MPa and less than or equal to 2 MPa on a third mixed solution formed in the third step. A pH of the third mixed solution is more than or equal to 3.5 and less than or equal to 5.0, a highest temperature in the fourth step is more than 100° C. and less than or equal to 119° C., and the positive electrode active material belongs to a space group Pnma.

In the above structure, the lithium compound is preferably a lithium chloride, the first aqueous solution is preferably alkaline, and a base included in the first aqueous solution is preferably ammonia or organic amine.

In the above structure, the third step is preferably performed in an air atmosphere.

In the above structure, a thickness of a particle of the positive electrode active material is preferably more than or equal to 10 nm and less than or equal to 200 nm.

Another embodiment of the present invention is a lithium ion battery including the positive electrode active material manufactured according to any one of the above descriptions.

One embodiment of the present invention can provide a composite oxide with high diffusion rate of lithium. Another embodiment of the present invention can provide a lithium-containing complex phosphate with high diffusion rate of lithium. Another embodiment of the present invention can provide a positive electrode active material with high diffusion rate of lithium. Another embodiment of the present invention can provide a lithium ion battery with high output. Another embodiment of the present invention can provide a lithium ion battery that can be manufactured at low cost. Another embodiment of the present invention can provide a novel battery.

Note that one embodiment of the present invention is not limited to these effects. For example, depending on circumstances or conditions, one embodiment of the present invention might produce another effect. Furthermore, depending on circumstances or conditions, one embodiment of the present invention might not produce any of the above effects.

BRIEF DESCRIPTION OF THE DRAWINGS

In the accompanying drawings:

FIGS. 18A to 18C illustrate an example of a storage battery;

FIGS. 20A1, 20A2, 20B1, and 20B2 illustrate examples of power storage systems;

DETAILED DESCRIPTION OF THE INVENTION

Figure 1:
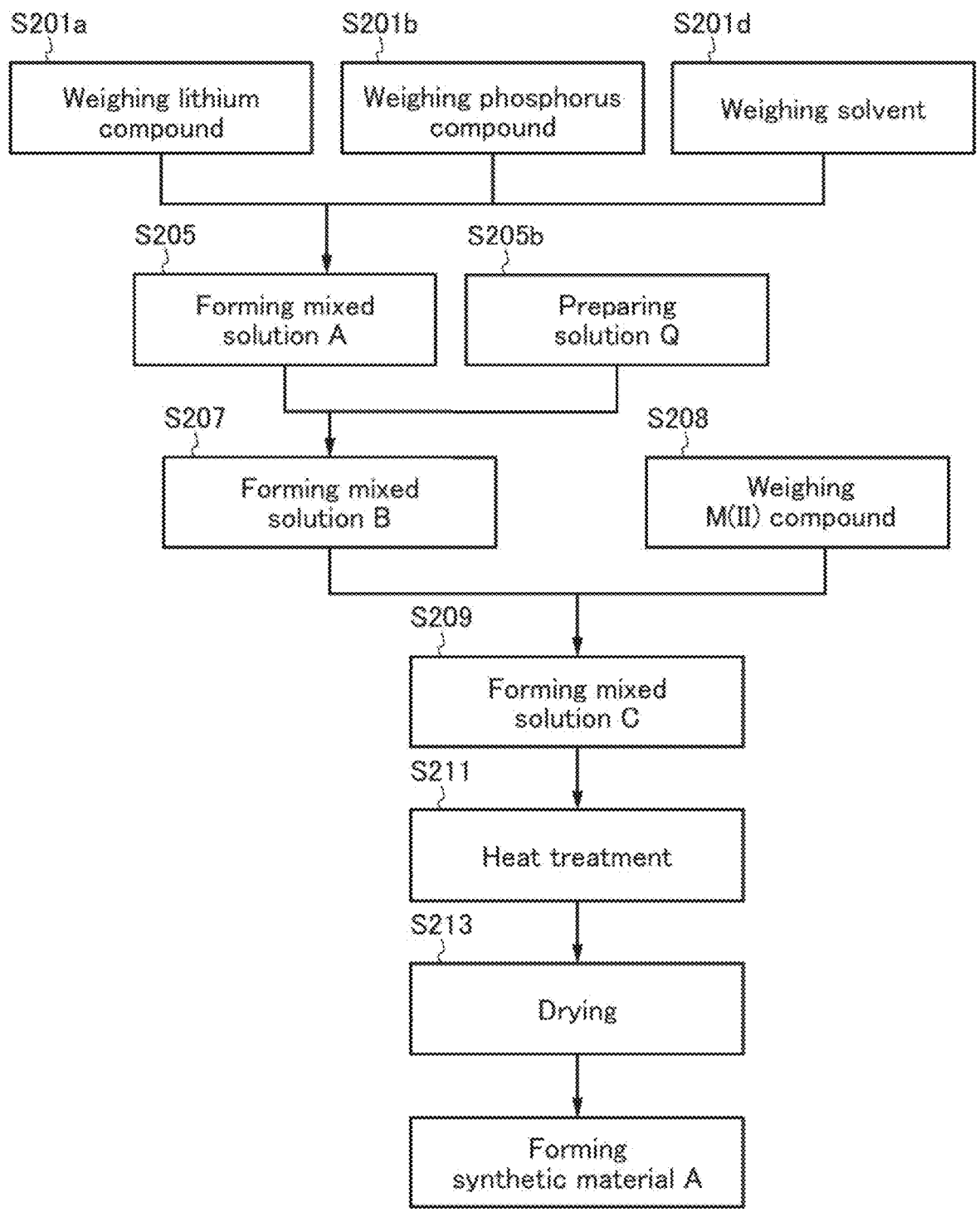
FIG. 1 is a flowchart of a method for manufacturing a lithium-containing complex phosphate.

Embodiments of the present invention will be described in detail below with reference to the accompanying drawings. However, the present invention is not limited to the descriptions of the embodiments and it is easily understood by those skilled in the art that the mode and details can be changed variously. Accordingly, the present invention should not be interpreted as being limited to the descriptions of the embodiments below.

Note that in drawings used in this specification, the sizes, thicknesses, and the like of components such as films, layers, substrates, and regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Embodiment 1

In this embodiment, a lithium-containing complex phosphate of one embodiment of the present invention will be described.

The lithium-containing complex phosphate of one embodiment of the present invention is manufactured using a liquid phase method and more preferably, a hydrothermal method. Further, by manufacturing the lithium-containing complex phosphate of one embodiment of the present invention at a lower temperature, particles of the lithium-containing complex phosphate having a more favorable shape can be obtained in some cases. For example, by manufacturing at a lower temperature, the lithium-containing complex phosphate having a flat shape or a columnar shape can be obtained in some cases.

A lithium ion battery of one embodiment of the present invention preferably includes the lithium-containing complex phosphate of one embodiment of the present invention as an active material of an electrode.

The lithium-containing complex phosphate is a flat-shaped particle, whereby the filling rate of an active material per unit volume in an electrode using the lithium-containing complex phosphate as the active material can be higher in some cases than that of a spherical particle, for example.

Here, the filling rate is the proportion of the volume of the active material to the total volume. Further, the lithium-containing complex phosphate is the flat-shaped particle, whereby output of the lithium ion battery can be high in some cases, for example. Here, "high output of lithium ion battery" means that a current density is high in at least one of charge and discharge.

Further, the lithium-containing complex phosphate of one embodiment of the present invention is manufactured at a lower temperature; thus, productivity of a manufacturing process can be improved. Further, by manufacturing at a lower temperature, the lithium-containing complex phosphate can be manufactured at low cost in some cases.

Further, the lithium-containing complex phosphate of one embodiment of the present invention is preferably a particle, further preferably a columnar-shaped particle, and still further preferably a flat-shaped particle.

<Manufacturing Method>

A method for manufacturing the lithium-containing complex phosphate according to one embodiment of the present invention will be described with reference to FIG. 1.

In Step S201a, a lithium compound is weighed. In Step S201b, a phosphorus compound is weighed.

Here, the atomic ratio of lithium to metal M(II) to phosphorus of the lithium-containing complex phosphate preferably obtained as a synthetic material A, described later, is x:y:z. The number of moles of lithium of the lithium compound weighed in Step S201a is f, the number of moles of phosphorus of the phosphorus compound weighed in Step S201b is g, the number of moles of metal M(II) of the M(II) compound weighed in Step S201c is h. Preferably, f/g is 1.5 times to 3.5 times as large as x/y, more preferably larger than 2.6 times and smaller than 3.4 times as large as x/y and preferably, h/g is 0.7 times to 1.3 times as large as z/y. Here, when x:y:z is 1:1:1, a lithium-containing complex phosphate having an olivine structure can be obtained, for example.

Typical examples of the lithium compound include lithium chloride (LiCl), lithium acetate ($LiCH_3COO$), lithium oxalate (($COOLi)_2$) lithium carbonate ($Li_2CO_3$), and lithium hydroxide monohydrate ($LiOH \cdot H_2O$).

Typical examples of the phosphorus compound are a phosphoric acid such as orthophosphoric acid ($H_3PO_4$), and ammonium hydrogenphosphates such as diammonium hydrogenphosphate (($NH_4)_2HPO_4$) and ammonium dihydrogenphosphate ($NH_4H_2PO_4$).

Next, in Step S201d, a solvent is weighed. Water is preferably used as the solvent. Further, a mixed solution containing water and another solvent may be used as the solvent. For example, water and alcohol may be mixed. Here, the solubility of the lithium compound, the phosphorus compound, and a reaction product of the lithium compound and the phosphorus compound in water and the solubility thereof in alcohol are different in some cases. By using alcohol, the grain size of the particle, which is to be formed, becomes smaller in some cases. Further, by using alcohol with a lower boiling point than water, pressure can be easily increased in some cases in Step S211 described later.

Next, a mixed solution A is formed in Step S205 Mixing can be performed under an atmosphere of air, inert gas, or the like. As the inert gas, nitrogen may be used, for example. Here, as an example, in an air atmosphere, the solvent weighed in Step S201d, the lithium compound weighed in Step S201a, and the phosphorus compound weighed in Step S201b are mixed. For example, the lithium compound weighed in Step S201a and the phosphorus compound weighed in Step S201b are put in the solvent weighed in Step S201d, so that the mixed solution A is formed. In the case of forming the mixed solution A in the air atmosphere, an apparatus for controlling the atmosphere is not necessary, so that the process can be simplified and cost can be reduced as compared with the case where inert gas is used.

It can be considered that in the mixed solution A, the lithium compound, the phosphorus compound, and the reaction product of the lithium compound and the phosphorus compound precipitate, but are partly dissolved without precipitating, i.e., partly exist in the solvent as ions. Here, when the mixed solution A has a low pH, there are cases where the reaction product and the like are easily dissolved in the solvent. When the mixed solution A has a high pH, there are cases where the reaction product and the like are easily precipitated in the solvent.

Note that instead of forming the mixed solution A through Step S205, a compound including phosphorus and lithium such as $Li_3PO_4$, $Li_2HPO_4$, or $LiH_2PO_4$ is weighed and added to the solvent so that the mixed solution A may be formed.

Here, in the case where the mixed solution A is an aqueous solution, pH of the mixed solution A is determined by the type and dissociation degree of salt included in the mixed solution A. Thus, with the lithium compound and the phosphorus compound used as source materials, pH of the mixed solution A changes. For example, in the case of using the lithium chloride as the lithium compound and the orthophosphoric acid as the phosphorus compound, the mixed solution A is a strong acid. Further, for example, in the case where the lithium hydroxide monohydrate is used as the lithium compound, the mixed solution A is likely to be alkaline.

Next, the mixed solution A and a solution Q weighed in Step S205b are mixed, so that a mixed solution B is formed in Step S207. Here, by adjusting the amount or concentration of the solution Q which is added, pH of the obtained mixed solution B and that of a later obtained mixed solution C can be adjusted. In Step S207, while pH of the mixed solution A is measured, the solution Q may be dropped, for example. As the solution Q, the alkaline solution or the acid solution is used in accordance with pH of the mixed solution A. By using a slightly alkaline solution, or a slightly acidic solution, pH is easily adjusted in some cases. For example, a pH of the alkaline solution may be greater than or equal to 8 and less than or equal to 12. Further, a pH of the acid solution may be greater than or equal to 2 and less than or equal to 6. As the alkaline solution, ammonia water may be used, for example. It is preferable to determine pH of the solution Q so that the mixed solution C, which is described later, is acidic or neutral. For example, in the case of using the lithium chloride as the lithium compound and the orthophosphoric acid as the phosphorus compound, the solution Q may be alkaline.

In Step S208, one or more of an iron(II) compound, a manganese(II) compound, a cobalt(II) compound, and a nickel(II) compound (hereinafter referred to as an M(II) compound) are weighed.

Typical examples of the iron(II) compound are iron chloride tetrahydrate ($FeCl_2 \cdot 4H_2O$), iron sulfate heptahydrate ($FeSO_4 \cdot 7H_2O$), and iron acetate ($Fe(CH_3COO)_2$).

Typical examples of the manganese(II) compound are manganese chloride tetrahydrate ($MnCl_2 \cdot 4H_2O$), manganese sulfate-hydrate ($MnSO_4 \cdot H_2O$), and manganese acetate tetrahydrate ($Mn(CH_3COO)_2 \cdot 4H_2O$).

Typical examples of the cobalt(II) compound are cobalt chloride hexahydrate ($CoCl_2 \cdot 6H_2O$), cobalt sulfate heptahydrate ($CoSO_4 \cdot 7H_2O$), and cobalt acetate tetrahydrate($Co(CH_3COO)_2 \cdot 4H_2O$).

Typical examples of the nickel(II) compound are nickel chloride hexahydrate ($NiCl_2 \cdot 6H_2O$), nickel sulfate hexahydrate ($NiSO_4 \cdot 6H_2O$), and nickel acetate tetrahydrate ($Ni(CH_3COO)_2 \cdot 4H_2O$).

Next, the mixed solution C is formed in Step S209. Step S209 can be performed under an atmosphere of air, inert gas, or the like. As the inert gas, nitrogen may be used, for example. Here, as an example, in an air atmosphere, the mixed solution A formed in Step S207 and the M(II) compound weighed in Step S208 are mixed so that the mixed solution C is formed. In the case of performing Step S209 in the air atmosphere, it is preferable that Step S208 is performed right before Step S209, for example, within 1 hour, further preferably within 20 minutes, still further preferably within 10 minutes.

Figure 2:
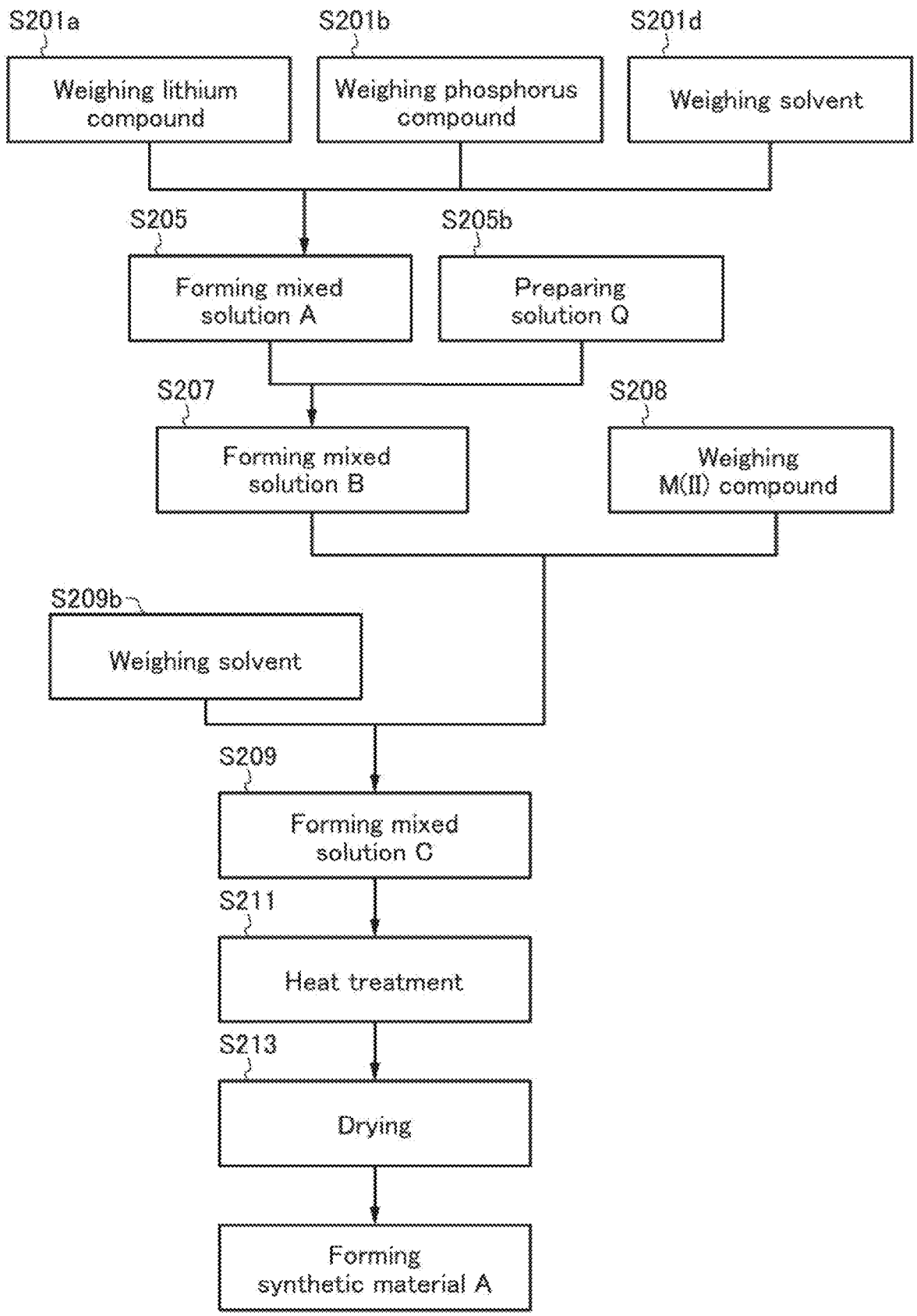
FIG. 2 is a flowchart of a method for manufacturing a lithium-containing complex phosphate.

As illustrated in FIG. 2, the solvent may be added to adjust the concentration of the mixed solution C in Step S209. In the flowchart illustrated in FIG. 2, after a mixture of the mixed solution B and the M(II) compound is formed, the solvent is weighed in Step S209b and the solvent and the mixture are mixed in Step S209 so that the mixed solution C is manufactured.

Next, in Step S211, the mixed solution C is put into a heat and pressure resistant container such as an autoclave. Heating is performed at a temperature higher than or equal to 100° C. and lower than or equal to 350° C., preferably higher than 100° C. and lower than 120° C. and under a pressure higher than or equal to 0.1 MPa and lower than or equal to 100 MPa, preferably higher than or equal to 0.1 MPa and lower than or equal to 2 MPa for more than or equal to 0.5 hours and less than or equal to 24 hours, preferably more than or equal to 1 hour and less than or equal to 10 hours, and further preferably more than or equal to 1 hour and less than 5 hours and the solution is then cooled. The solution in the heat and pressure resistant container is then filtered, followed by washing and drying. After that, the solution is separated. For example, filtration and washing are performed. Then, drying is performed in Step S213, and the synthetic material A is obtained.

As a result, a lithium-containing complex phosphate, more specifically, a lithium-containing complex phosphate having an olivine structure ($LiMPO_4$ (M is one or more of Fe(II), Ni(II), Co(II), and Mn(II))), for example, can be obtained as a synthetic material A. As the lithium-containing complex phosphate, $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, 0<e<1), $LiFe_fNi_gCo_hMn_iPO_4$ (f+g+h+i≤1, 0<f<1, 0<g<1, 0<h<1, <i<1), or the like can be obtained as appropriate depending on the type of the M(II) compound. The lithium-containing complex phosphate obtained in this embodiment might be a single-crystal grain.

By performing crystal analysis such as XRD or electron diffraction on the synthetic material A, the crystal structure can be identified. By performing crystal analysis on the synthetic material A, a crystal structure belonging to a space group Pnma can be obtained in some cases. Here, $LiMPO_4$ having an olivine crystal structure belongs to the space group Pnma, for example.

In Step S211, the reaction temperature is lowered so that the temperature of the apparatus can be lowered. Further, the cost required for the reaction can be reduced. As a result, productivity can be increased. Further, the reaction temperature is lowered so that a flatter shape can be obtained as the particle of the synthetic material A.

In FIG. 6 of Patent Document 1, a potential-pH diagram in the case of iron is illustrated. As apparent from FIG. 6 of the Patent Document 1, in the case where pH is high, hydroxide of iron or oxide of iron is stable and in the case where pH is low, iron(II) ion is stable.

Further, the reaction temperature in Step S211 is lowered so that the speed of the generation reaction of the synthetic material A is reduced and a by-product is easily generated in some cases. The generation of the by-product causes a reduction in yield. The by-product here, for example, refers to a different compound from the synthetic material A that is a target compound. The generation speed of the synthetic material A is preferably higher than the generation speed of the by-product.

The mixed solution C is preferably an acid (in other words, pH is lowered), so that the generation of the by-product can be suppressed even in the case where the reaction temperature is lowered in Step S211.

In the case where pH of the mixed solution C is high, a large amount of hydroxide ions is included. When pH of the mixed solution C is high, a hydroxide of an ion of a metal M is generated in some cases. From the hydroxide of the metal M here, an oxide of the metal M can be obtained in some cases. For example, an iron ion and the hydroxide ion react with each other to generate $Fe(OH)_2$, FeOOH can be generated from $Fe(OH)_2$, and $Fe_2O_3$ can be generated from FeOOH in some cases.

Thus, in the mixed solution C, a by-reaction such as the generation of the hydroxide of the M ion occur in some cases in addition to a reaction of an M ion, a phosphorus ion, and a lithium ion for obtaining a lithium-containing complex phosphate that is preferable as the synthetic material A.

By reducing pH of the mixed solution C, the by-reaction can be suppressed in some cases. On the other hand, when pH of the mixed solution C is too low, the target synthetic material A dissolves in some cases. Alternatively, the synthetic material A is not generated in some cases.

By reducing pH of the mixed solution C, dissolution and generation of the particle are repeated. It can be considered that the dissolution of a particle with low crystallinity is repeated and a particle with high crystallinity is grown, for example. The flat-shaped particle or a columnar-shaped particle as the particle with high crystallinity, for example, can be easily obtained in some cases.

For example, a phosphate compound including iron with a different valence (including the hydrate) can be obtained as a by-product in some cases. Alternatively, for example, ammonium iron phosphate (including the hydrate) can be obtained as a by-product in some cases.

The mixed solution C has a pH, for example, higher than or equal to 1.0 and lower than or equal to 8.0, further preferably higher than or equal to 2.0 and lower than or equal to 7.0, still further preferably higher than or equal to 3.0 and lower than or equal to 6.0, still yet further preferably higher than or equal to 3.5 and lower than or equal to 5.0.

In the case where iron is used as the element M, a pH of the mixed solution C is preferably at higher than or equal to 3.0 and lower than or equal to 6.0, further preferably higher than or equal to 3.5 and lower than or equal to 5.0, still further preferably higher than or equal to 3.5 and lower than or equal to 4.0 and the reaction temperature in Step S211 is, for example, preferably set higher than 100° C. and lower than or equal to 119° C., further preferably higher than or equal to 103° C. and lower than or equal to 117° C., still further preferably higher than or equal to 105° C. and lower than or equal to 115° C.

Further, the generated by-product is preferably separated by filtration, for example, so that it is removed. For example, a solution in which the by-product is likely to be dissolved is prepared. After mixing with the obtained material in Step S211, filtration may be performed. For example, an acid solution can be given as an example of the solution.

<Particle Shape>

The lithium-containing complex phosphate of one embodiment of the present invention is preferably a particle and further preferably a flat-shaped particle.

Figure 3A:
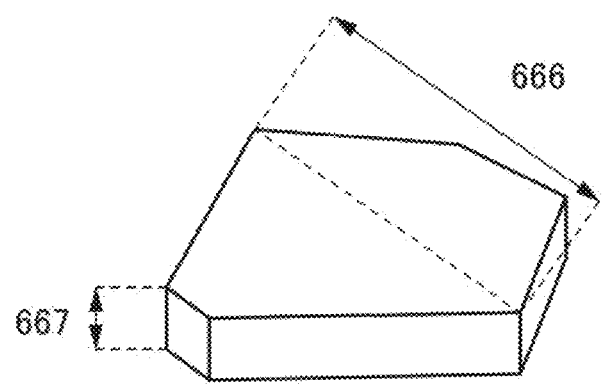
FIGS. 3A and 3B are each a perspective view illustrating an example of a particle.
Figure 3B:
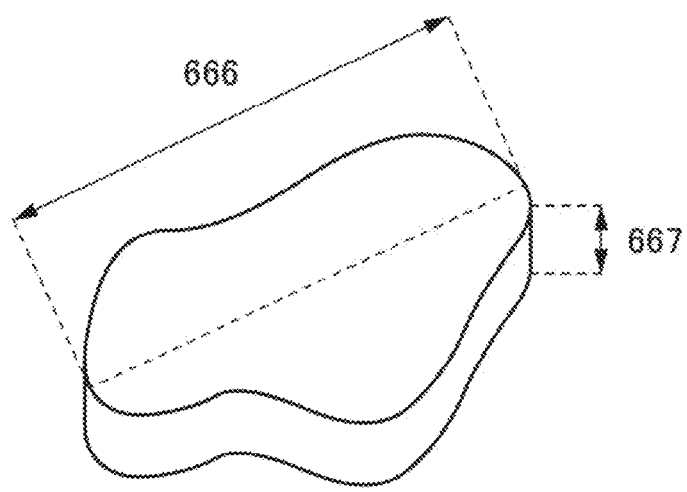

Here, the flat-shaped particle includes a largest surface and a thickness in a direction substantially perpendicular to the surface. A thickness 667 of the flat-shaped particle is, for example, more than or equal to 5 nm and less than or equal to 500 nm and preferably more than or equal to 10 nm and less than or equal to 200 nm. The widest surface of the flat-shaped particle has a length 666 of more than or equal to 50 nm and less than or equal to 3 μm. Alternatively, the length 666 is 3 to 200 times the thickness 667 and preferably 10 to 50 times the thickness 667. Here, the length of the surface may be, for example, the diameter of a circle obtained by converting the area of the surface. An example of a flat-shaped particle and examples of the length 666 and the thickness 667 are shown in FIGS. 3A and 3B. FIG. 3A shows a particle in a substantially flat polygonal-prism shape. FIG. 3B shows an example of a particle including a largest surface with a curved side surface.

Preferably, the direction of the thickness 667 and the direction of the b axis are substantially parallel to each other and preferably, the angle between the direction of the thickness 667 and the direction of the b axis is more than or equal to 0° and less than or equal to 20° in the case where the lithium-containing complex phosphate has an olivine structure, for example. In the case where the thickness 667 and the b axis are substantially parallel, lithium can easily diffuse in the lithium-containing complex phosphate, so that output characteristics of a storage battery are improved.

Alternatively, the lithium-containing complex phosphate of one embodiment of the present invention may have a columnar shape. In the case where the length of the cross section is larger than that of the height, the lithium-containing complex phosphate has a flat shape, as described above. In addition, preferably the b axis is substantially perpendicular to the height direction of the column, preferably the length of the cross section is more than or equal to 5 nm and less than or equal to 100 nm, and preferably the height is more than or equal to 50 nm and less than or equal to 3 μm in the case where the length of the cross section is smaller than the height.

<XRD>

Figure 29A:
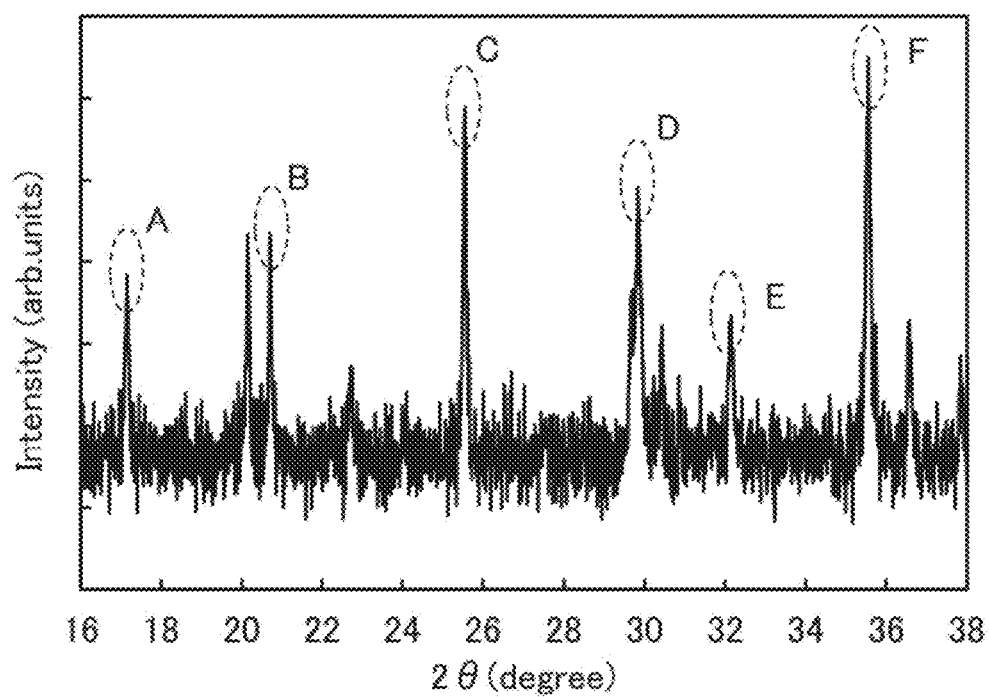
FIGS. 29A and 29B show XRD evaluation results.

FIG. 29A shows the XRD measurement results obtained by a θ-2θ method from the lithium-containing complex phosphate of one embodiment of the present invention described later in Example 1. Six peaks in total having maximum values at 2θ of 17.1°, 20.7°, 25.5°, 29.8°, 32.1°, and 35.6° in the range of 2θ from 17° to 36° can be observed as A to F illustrated in FIG. 29A. The six peaks correspond to Power diffraction file (PDF) Number 01-070-6684 of the International Centre for Diffraction Data (ICDD). Thus, it is suggested that the lithium-containing complex phosphate corresponds to $LiFePO_4$ in the space group Pnma.

The lithium-containing complex phosphate of one embodiment of the present invention preferably includes peaks A, B, C, D, E, and F in the XRD measurement performed by the θ-2θ method. Note that in the case where the lithium-containing complex phosphate is aligned, one or more of the six peaks A to F am difficult to observe in some cases. Thus, the lithium-containing complex phosphate of one embodiment of the present invention preferably includes two or more peaks, further preferably three or more peaks, still further preferably all the six peaks of the six peaks A to F.

The degree of 2θ at which the peak A has the maximum value is A1 [° ] and the half width of the peak is A2 [° ]. The degree of 2θ at which the peak B has the maximum value is B1 [° ] and the half width of the peak is B2 [° ]. The degree of 2θ at which the peak C has the maximum value is C1 [° ] and the half width of the peak is C2 [°]. The degree of 2θ at which the peak D has the maximum value is D1 [° ] and the half width of the peak is D2 [° ]. The degree of 2θ at which the peak E has the maximum value is E1 [° ] and the half width of the peak is E2 [°]. The degree of 2θ at which the peak F has the maximum value is F1 [°] and the half width of the peak is F2 [° ].

A1 is preferably more than 16.82° and less than 17.52°, further preferably more than 16.87° and less than 17.47°, still further preferably more than 17.02° and less than 17.32°.

B1 is preferably more than 20.45° and less than 21.15°, further preferably more than 20.50° and less than 21.10°, still further preferably more than 20.65° and less than 20.950.

C1 is preferably more than 25.24° and less than 25.94°, further preferably more than 25.29° and less than 25.89°, still further preferably more than 25.44° and less than 25.74°.

D1 is preferably more than 29.40° and less than 30.10°, further preferably more than 29.45° and less than 30.05°, still further preferably more than 29.60° and less than 29.900.

E1 is preferably more than 31.90° and less than 32.60°, further preferably more than 31.95° and less than 32.55°, still further preferably more than 32.1° and less than 32.4°.

F1 is preferably more than 35.28° and less than 35.985°, further preferably more than 35.33° and less than 35.93°, still further preferably more than 35.48° and less than 35.78°.

The half width of the peak observed in the XRD measurement can be small in some cases when the crystallinity is high. Further, the half width of the peak can be small when the grain size of the crystal is large. Thus, the half width of the peak observed in the XRD measurement is preferably less than 2, further preferably less than 1, still further preferably less than 0.3, still yet further preferably less than 0.2. For example, A2, B2, C2, D2, E2, and F2 are more than 0.02 and less than 2, more than 0.03 and less than 2, or more than 0.03 and less than 1.

<Effect of pH>

Although the details are described in Example 1 later, the XRD measurement results of the product obtained after Step S211 in the case where the mixed solution B has a pH in the vicinity of 6 and the mixed solution C has a pH in the vicinity of 5 are shown in FIG. 29A.

Figure 28A:
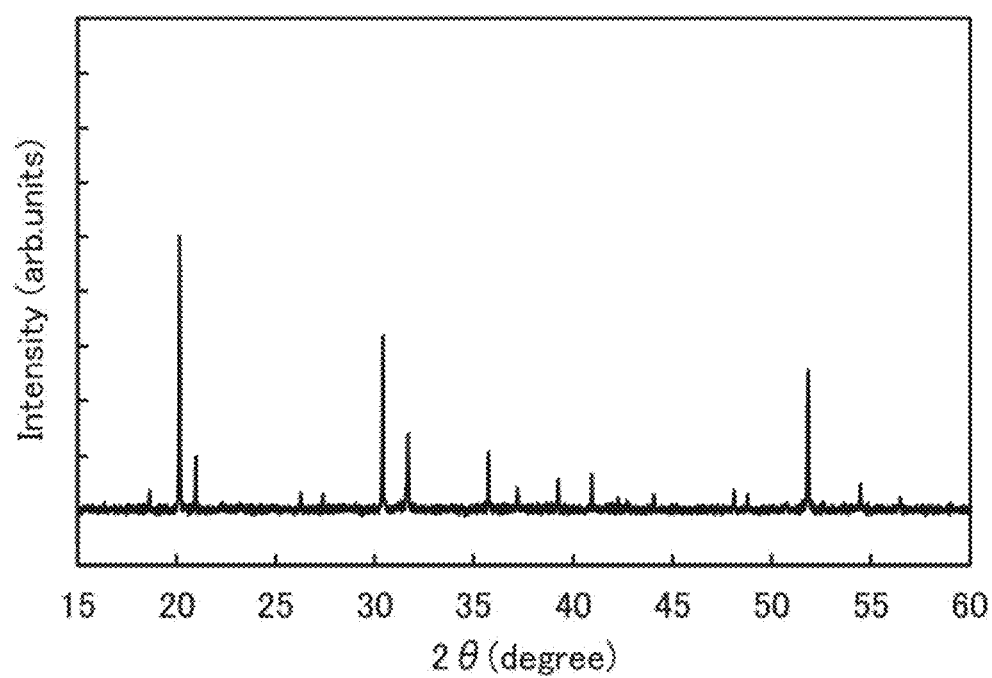
FIGS. 28A and 28B show XRD evaluation results.
Figure 28B:
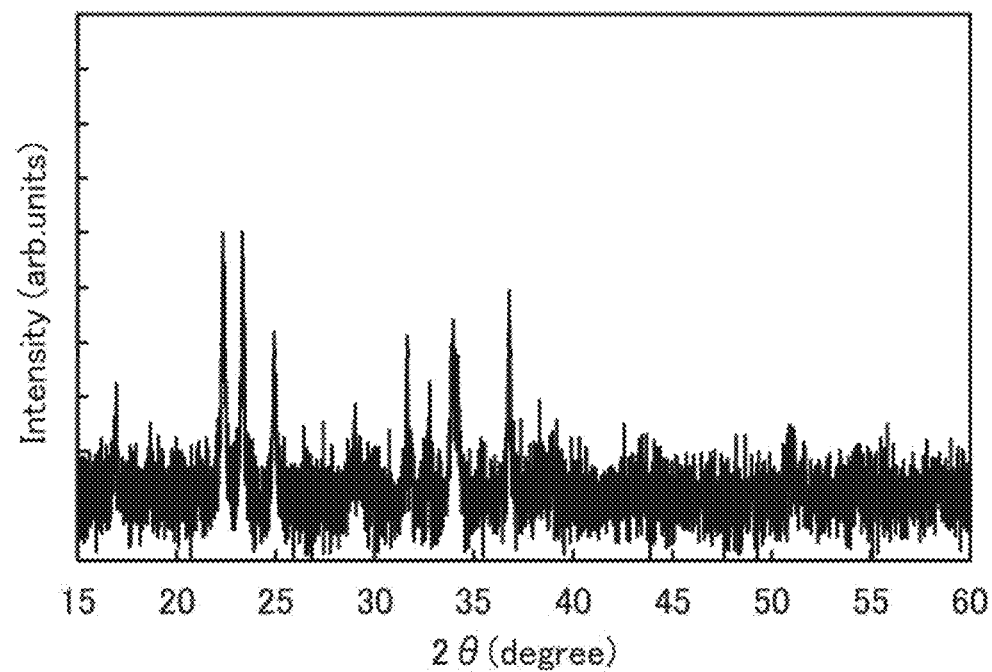

The XRD measurement results of the product obtained after Step S211 in the case where the mixed solution B has a pH in the vicinity of 10 and the mixed solution C has a pH in the vicinity of 9 are shown in FIG. 28B. Although the details are described in Example 1 later, it is suggested that the XRD measurement results correspond to the peaks of $Li_3PO_4$. In Step S207, $Li_3PO_4$ used for manufacturing the mixed solution probably remains. Further, the peak observed at 31.7° probably corresponds to $NH_4FePO_4 \cdot H_2O$.

The XRD measurement results of the product obtained after Step S211 in the case where the mixed solution B has a pH in the vicinity of 8 and the mixed solution C has a pH in the vicinity of 6 are shown in FIG. 28A. Although the details are described in Example 1 later, it is suggested that the XRD measurement results correspond to the peaks of $NH_4FePO_4·H_2O$ according to the database.

In such a manner, in the case where pH of the mixed solution B is high, for example, in the case where a pH exceeds 7, yield of the target synthetic material A decreases and compounds such as $Li_3PO_4$ and $NH_4FePO_4·H_2O$ are generated in some cases.

The lithium-containing complex phosphate of one embodiment of the present invention can be used as an active material in a lithium ion battery. The lithium-containing complex phosphate of one embodiment of the present invention preferably has an olivine structure. Further, in the case where the lithium-containing complex phosphate of one embodiment of the present invention has an olivine structure, the capacity per unit weight of the active material is more than or equal to 100 mAh/g and less than or equal to 170 mAh/g or more than or equal to 130 mAh/g and less than or equal to 160 mAh/g in the case where the rate is 0.2 C, for example.

Embodiment 2

In this embodiment, a storage battery of one embodiment of the present invention will be described.

A storage battery of one embodiment of the present invention includes a positive electrode, a negative electrode, and an electrolytic solution.

The positive electrode active material preferably includes the lithium-containing complex phosphate and the like described in Embodiment 1.

[Negative Electrode Active Material]

In the case where the active material is a negative electrode active material, for example, an alloy-based material, a carbon-based material, or the like can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include meso-carbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into the graphite (while a lithium-graphite intercalation compound is generated). For this reason, a lithium ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm³).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

[Predoping]

In the case where a coating film is formed in the initial charge and discharge cycle, an irreversible reaction occurs. For example, in the case where one of an irreversible reaction at the positive electrode and an irreversible reaction at the negative electrode is greater, the balance between charge and discharge might be disrupted, resulting in a decrease in the capacity of the storage battery. Replacing an electrode used as a counter electrode after charge and discharge using the counter electrode are performed can inhibit a decrease in capacity. For example, charge or charge and discharge are performed using a positive electrode in combination with a negative electrode, and then, the positive electrode is removed to be replaced with another positive electrode in the storage battery. This may inhibit a decrease in the capacity of the storage battery. This method may be called predoping or preaging.

A current collector included in each of the positive electrode and the negative electrode can be formed using a material that has high conductivity, such as a metal of stainless steel, gold, platinum, aluminum, titanium, or the like, or an alloy thereof. In the case where the current collector is used in the positive electrode, it is preferred that it not dissolve at the potential of the positive electrode. In the case where the current collector is used in the negative electrode, it is preferred that it not be alloyed with carrier ions such as lithium. Alternatively, the current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector can have any of various shapes including a foil-like shape, a plate-like shape (sheet-like shape), a net-like shape, a punching-metal shape, and an expanded-metal shape. The current collector preferably has a thickness of 5 μm to 30 μm inclusive.

The positive electrode and the negative electrode may include a conductive additive. Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound may have excellent electrical characteristics of high conductivity and excellent physical properties of high flexibility and high mechanical strength. A graphene compound has a planar shape and enables low-resistant surface contact. Furthermore, a graphene compound has extremely high conductivity even with a small thickness in some cases and thus allows a conductive path to be formed in an active material layer efficiently even with a small amount. Thus, a graphene compound is preferably used as a conductive additive, in which case the area where an active material and the conductive additive are in contact with each other can be increased and electrical resistance may be reduced. Here, it is particularly preferred that graphene, multilayer graphene, or reduced graphene oxide (hereinafter referred to as RGO) be used as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. In such a case, a graphene compound that can efficiently form a conductive path even in a small amount is particularly preferably used.

A cross-sectional structure example of the active material layer containing a graphene compound as a conductive additive will be described below.

Figure 4A:
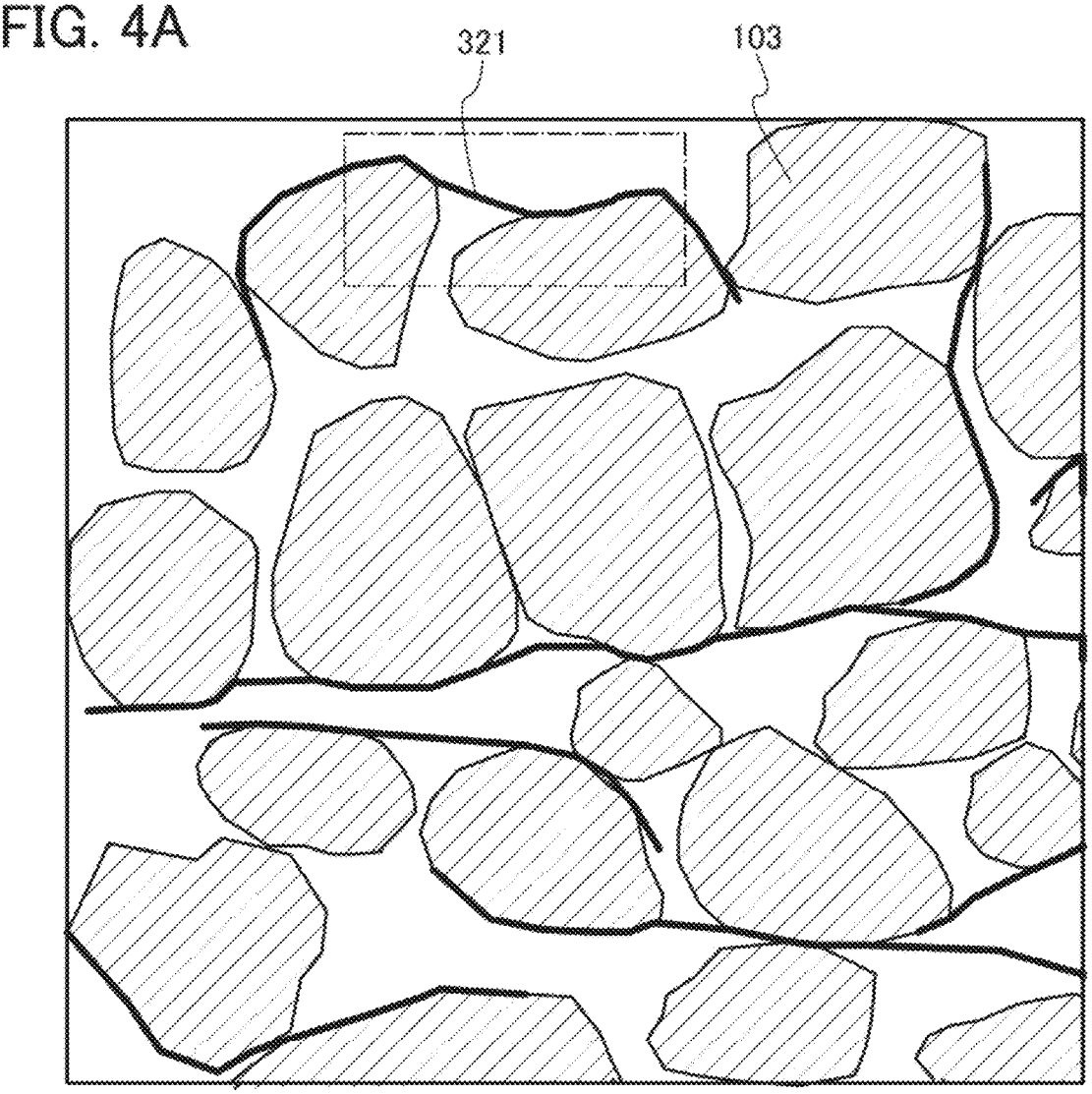
FIGS. 4A and 4B are diagrams illustrating part of a cross section of an electrode.
Figure 4B:
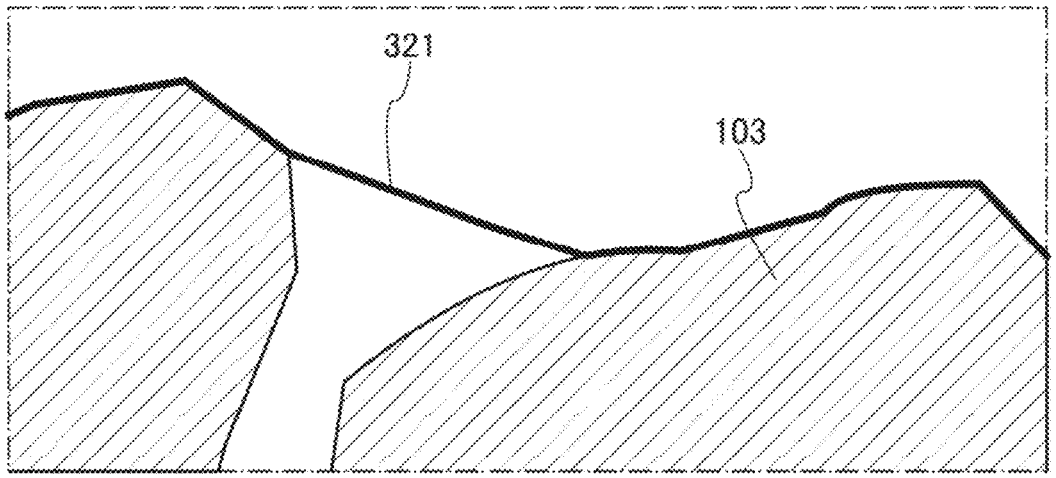

FIG. 4A is a longitudinal sectional view of the active material layer. The active material layer includes active material particles 103, graphene compounds 321 as a conductive additive, and a binder (not illustrated). Here, graphene or multilayer graphene can be used as the graphene compound 321, for example. The graphene compound 321 preferably has a sheet-like shape. The graphene compound 321 may have a sheet-like shape formed of a plurality of sheets of multilayer graphene and/or a plurality of sheets of graphene that partly overlap with each other.

The longitudinal section of the active material layer in FIG. 4A shows substantially uniform dispersion of the graphene compounds 321 in the active material layer. The graphene compounds 321 are schematically shown by thick lines in FIG. 4A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103.

Here, a plurality of graphene compounds are bonded to each other to form net-like graphene compound sheet (hereinafter referred to as a graphene compound net or a graphene net). The graphene net covering the active material can function as a binder for binding active materials. The amount of the binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer is formed in such a manner that graphene oxide is used as the graphene compound 321 and mixed with an active material. When graphene oxide with extremely high dispersibility in a polar solvent is used for the formation of the graphene compounds 321, the graphene compounds 321 can be substantially uniformly dispersed in the active material layer. The solvent is removed by volatilization from a dispersion medium in which graphene oxide is uniformly dispersed, and the graphene oxide is reduced; hence, the graphene compounds 321 remaining in the active material layer partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compounds 321 than that of a normal conductive additive. Thus, the proportion of the active material particles 103 in the active material layer can be increased. Accordingly, the discharge capacity of a power storage device can be increased.

The positive electrode and the negative electrode may each include a binder. As the binder, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrufluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

Two or more of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethy cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolytic solution. Hem, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

[Method for Manufacturing Electrode]

In examples of methods for manufacturing negative and positive electrodes, a slurry is formed and an electrode is manufactured by application of the slurry. A method for forming a slurry used for manufacturing an electrode will be described.

A polar solvent is preferably used as the solvent used for formation of the slurry. Examples of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

First, the active material, the conductive additive, and the binder are mixed to form Mixture A (Step S110). Next, the solvent is added to Mixture A and kneading (mixing with a high viscosity) is performed, so that Mixture B is formed (Step S120). Here, Mixture B is preferably in a paste form, for example. In the case where a second binder is added in a later step S141, a first binder is not necessarily added in Step S110 in some cases.

Next, the solvent is added to Mixture B and kneading is performed, so that Mixture C is formed (Step S130).

Next, in the case where the second binder is used, the second binder is added to form Mixture D (Step S141). At this time, a solvent may be added. In the case where the second binder is not used, a solvent is added as needed to form Mixture E (Step S142).

Then, Mixture D or Mixture E is mixed in a reduced-pressure atmosphere to form Mixture F (Step S150). At this time, a solvent may be added. In the mixing and kneading steps in Steps S110 to S150, a mixer may be used, for example.

Next, the viscosity of Mixture F is measured (Step S160). After that, a solvent is added as needed to adjust the viscosity. Through the above steps, slurry for application of the active material layer is obtained.

Here, for example, the higher the viscosity of Mixtures C to F in Steps S130 to S160 is, the higher the dispersibility of the active material, the binder, and the conductive additive in the mixtures is (the better they are mixed together), in some cases. Thus, the viscosity F is preferably higher. However, an excessively high viscosity of Mixture F is not preferred in terms of productivity because it might reduce the electrode application speed.

Next, a method for manufacturing the active material layer over the current collector with the use of the formed slurry will be described.

First, the slurry is applied to the current collector. Before the application of the slurry, surface treatment may be performed on the current collector. Examples of surface treatment include corona discharge treatment, plasma treatment, and undercoat treatment. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

For the application of the slurry, a slot die method, a gravure method, a blade method, or combination of any of them can be used. Furthermore, a continuous coater or the like may be used for the application.

Then, the solvent of the slurry is volatilized to form the active material layer.

The step of volatilizing the solvent of the slurry is preferably performed at a temperature in the range from 50° C. to 200° C. inclusive, more preferably from 60° C. to 150° C. inclusive.

Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example.

The temperature may be increased in stages. For example, after heat treatment is performed at 60° C. or lower for shorter than or equal to 10 minutes, another heat treatment may further be performed at higher than or equal to 65° C. for longer than or equal to 1 minute.

The thickness of the active material layer formed through the above steps is, for example, preferably greater than or equal to 5 μm and less than or equal to 300 μm, more preferably greater than or equal to 10 μm and less than or equal to 150 μm. Furthermore, the amount of the active material in the active material layer is, for example, preferably greater than or equal to 2 mg/cm$^2$ and less than or equal to 50 mg/cm$^2$.

The active material layer may be formed over only one surface of the current collector, or the active material layers may be formed such that the current collector is sandwiched therebetween. Alternatively, the active material layers may be formed such that part of the current collector is sandwiched therebetween.

After the volatilization of the solvent from the active material layer, pressing may be performed by a compression method such as a roll press method or a flat plate press method. In performing pressing, heat may be applied.

Note that the active material layer may be predoped. There is no particular limitation on the method for predoping the active material layer. For example, the active material layer may be predoped electrochemically. For example, before a battery is assembled, the active material layer can be predoped with lithium in an electrolytic solution described later with the use of a lithium metal as a counter electrode. Alternatively, predoping may be performed using a positive electrode for predoping as a counter electrode of a negative electrode, and then, the positive electrode for predoping may be removed. Predoping can particularly inhibit a decrease in initial charge and discharge efficiency, leading to an increase in the capacity of the storage battery.

This embodiment can be implemented in combination with any of the other embodiments as appropriate.

Embodiment 3

In this embodiment, power storage devices of embodiments of the present invention will be described.

Examples of the power storage device of one embodiment of the present invention include a secondary battery that utilizes an electrochemical reaction, such as a lithium ion battery, an electrochemical capacitor such as an electric double-layer capacitor or a redox capacitor, an air battery, and a fuel battery.

<Thin Storage Battery>

Figure 5:
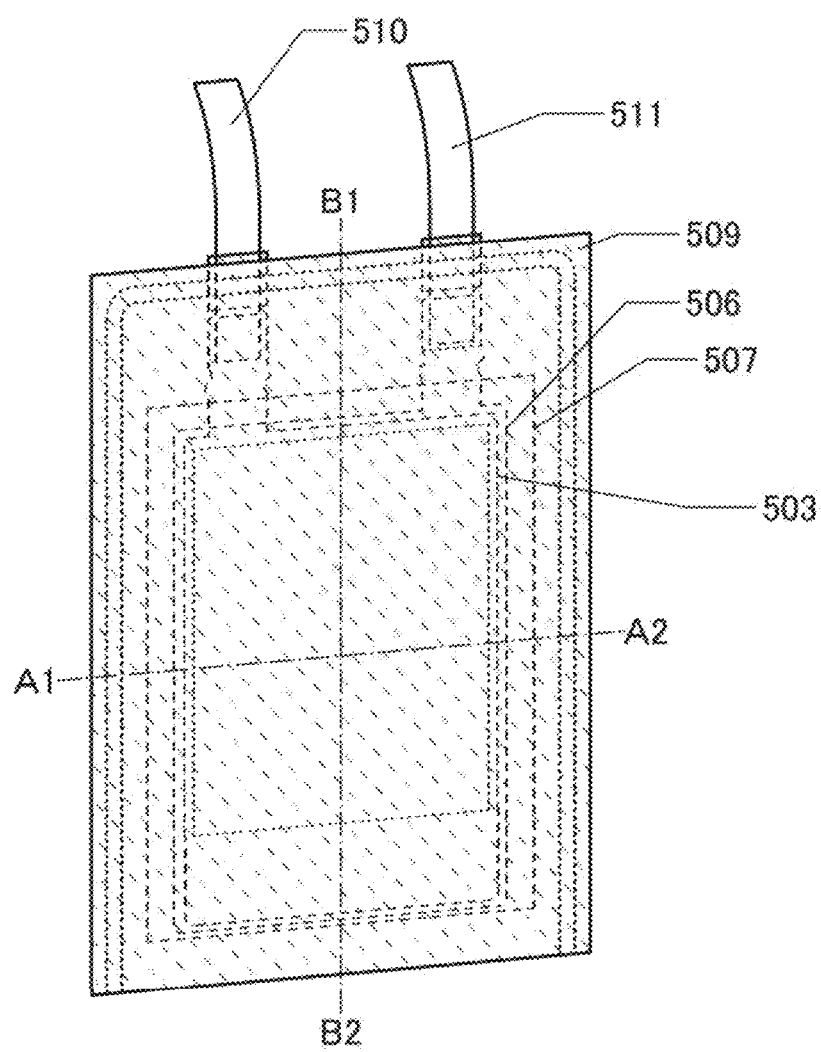
FIG. 5 illustrates a storage battery.

FIG. 5 illustrates a thin storage battery as an example of a storage device. When a flexible thin storage battery is used in an electronic device at least part of which is flexible, the storage battery can be bent as the electronic device is bent.

Figure 6A:
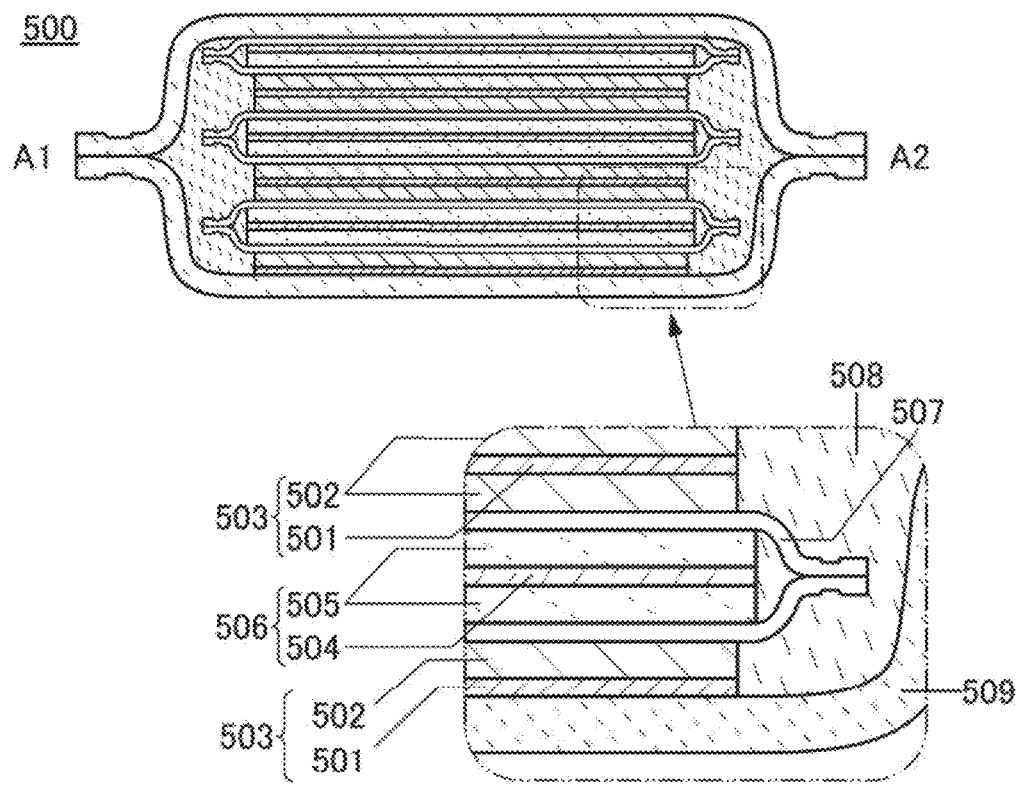
FIGS. 6A and 6B are cross-sectional views illustrating storage batteries.
Figure 6B:
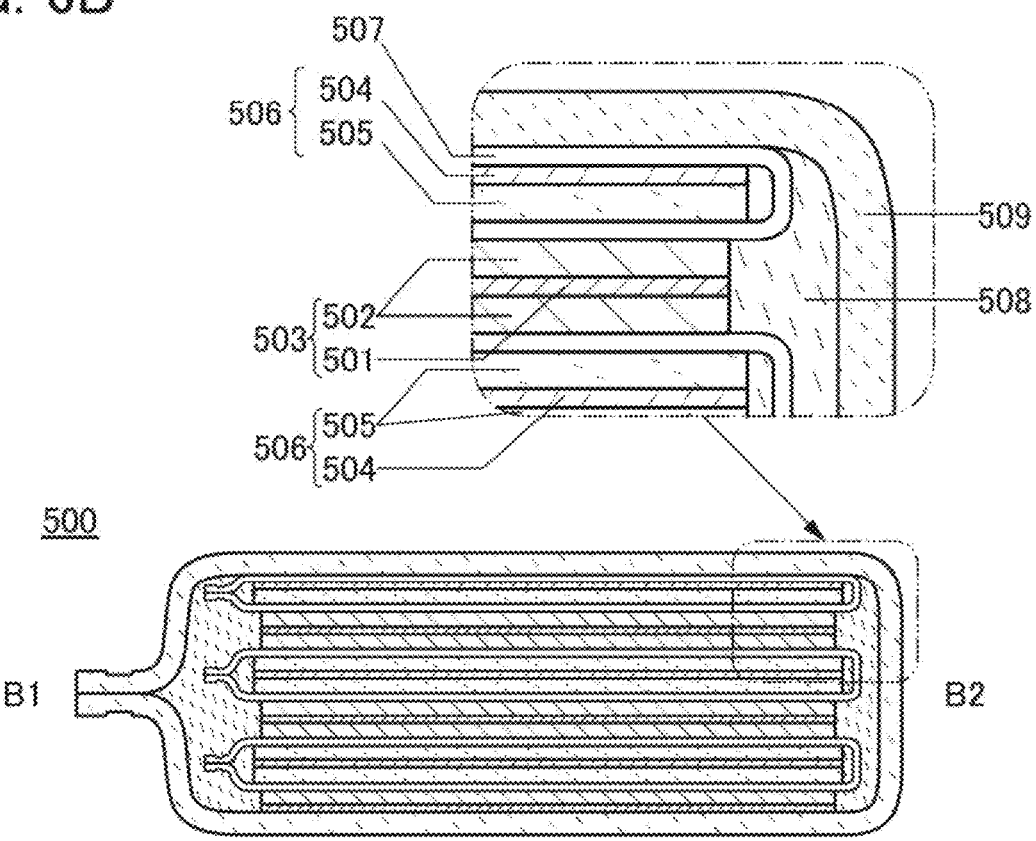

FIG. 5 is an external view of a storage battery 500, which is a thin storage battery. FIG. 6A is a cross-sectional view along dashed-dotted line A1-A2 in FIG. 5, and FIG. 6B is a cross-sectional view along dashed-dotted line B1-B2 in FIG. 5. The storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is contained in the exterior body 509.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, the use of one or more types of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gel polymer electrolyte obtained in such a manner that a polymer is swelled with an electrolytic solution may be used.

Examples of polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 7A:
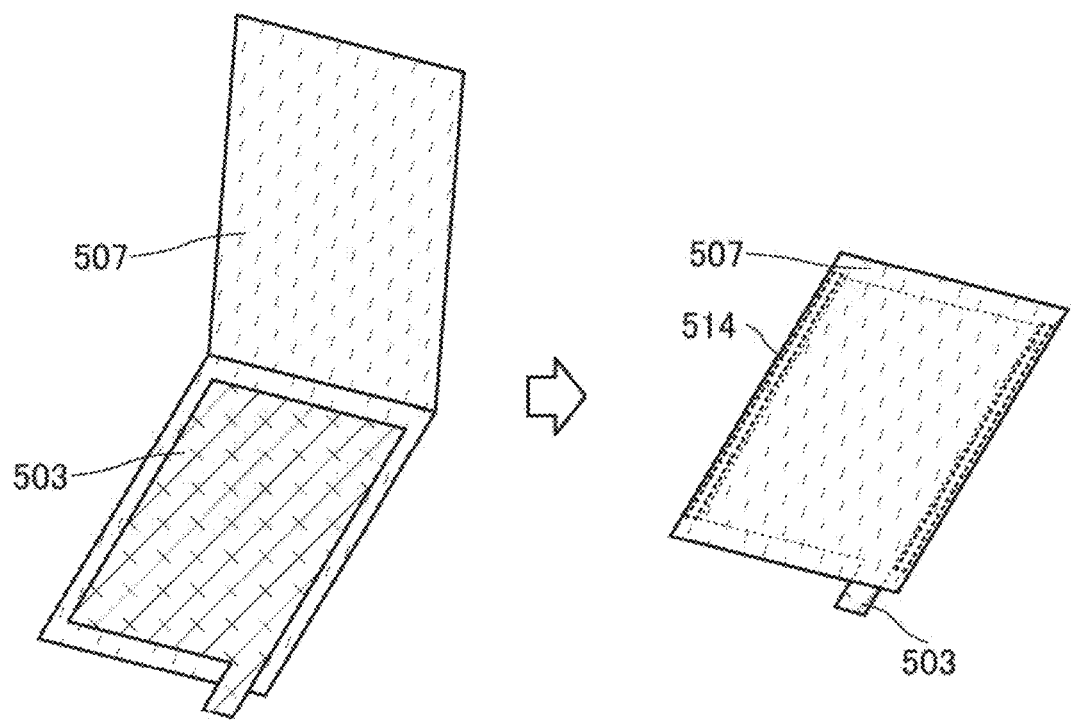
FIGS. 7A and 7B illustrate a method for manufacturing a storage battery.
Figure 7B:
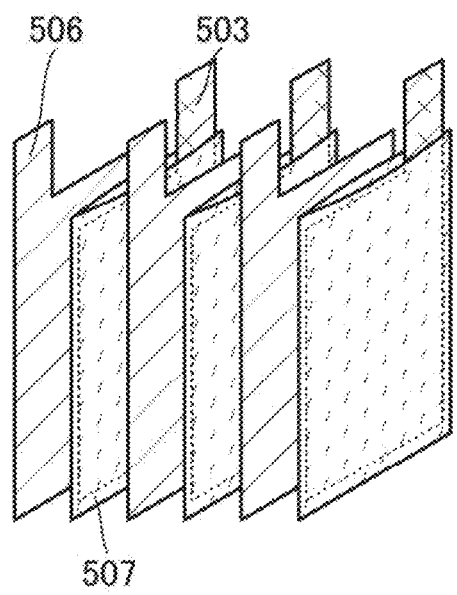

The separator 507 is preferably formed to have a bag-like shape to surround one of the positive electrode 503 and the negative electrode 506. For example, as illustrated in FIG. 7A, the separator 507 is folded in two so that the positive electrode 503 is sandwiched, and sealed with a sealing member 514 in a region outside the region overlapping with the positive electrode 503, thus, the positive electrode 503 can be reliably supported inside the separator 507. Then, as illustrated in FIG. 7B, the positive electrodes 503 surrounded by the separators 507 and the negative electrodes 506 are alternately stacked and provided in the exterior body 509, whereby the storage battery 500 can be formed.

Next, aging after manufacturing a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where the reaction potential of the positive electrode or the negative electrode is out of the range of the potential window of the electrolytic solution 508, the electrolytic solution is decomposed by charge and discharge operations of a storage battery in some cases. In the case where the electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased.

When the resistance is extremely increased, the negative electrode potential is lowered. Consequently, lithium is intercalated into graphite and lithium is deposited on the surface of graphite. The lithium deposition might reduce capacity. For example, if a film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the negative electrode potential reaches the potential of lithium because of an increase in a charging voltage.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a film on a surface of graphite. The formed coating film may thus be densified when the charging state is held at a temperature higher than room temperature after the release of the gas, for example.

Figure 8A:
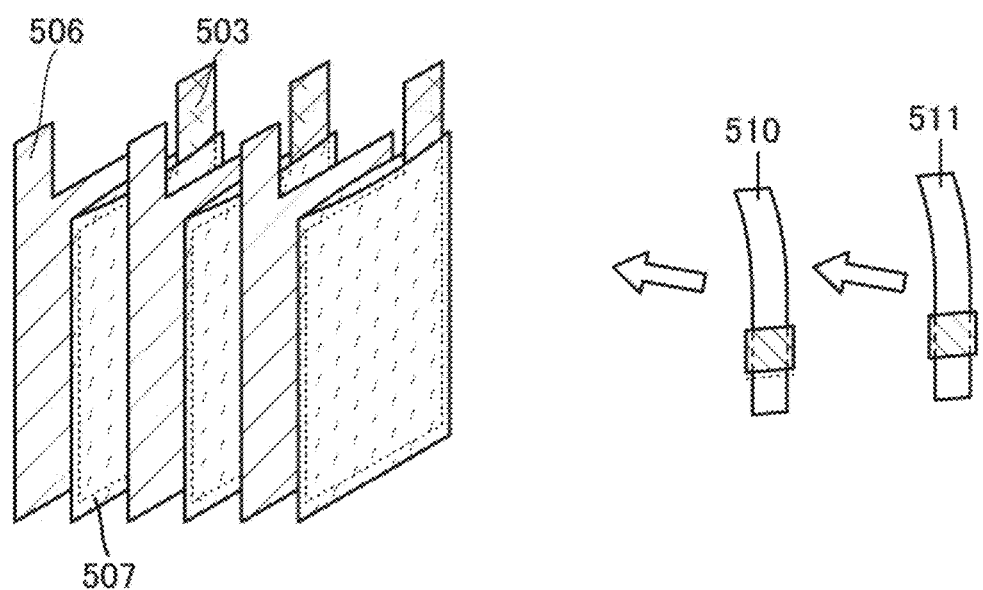
FIGS. 8A and 8B show a method for manufacturing a storage battery.
Figure 8B:
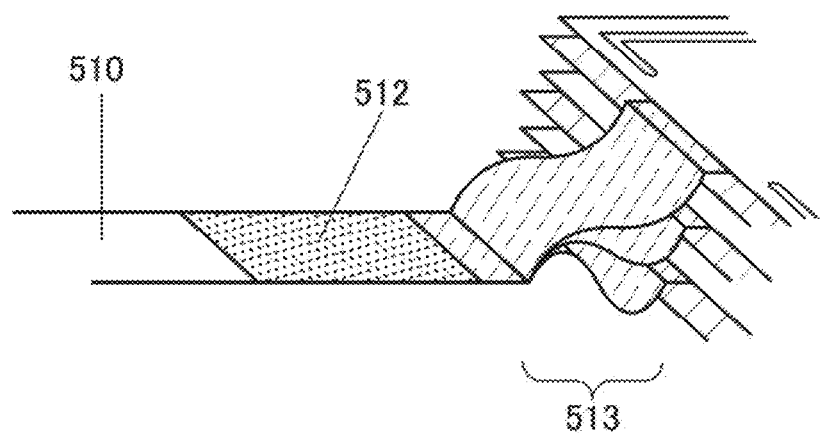

FIGS. 8A and 8B illustrate an example where current collectors are welded to a lead electrode. As illustrated in FIG. 8A, the positive electrodes 503 each wrapped by the separator 507 and the negative electrodes 506 are alternately stacked. Then, the positive electrode current collectors 501 are welded to a positive electrode lead electrode 510, and the negative electrode current collectors 504 are welded to a negative electrode lead electrode 511. FIG. 8B illustrates an example in which the positive electrode current collectors 501 an welded to the positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 8B, and it is therefore possible to relieve stress due to external force applied after manufacturing the storage battery 500. The reliability of the storage battery 500 can be thus increased.

In the storage battery 500 illustrated in FIG. 5 and FIGS. 6A and 6B, the positive electrode current collectors 501 in the positive electrode 503 and the negative electrode current collectors 504 in the negative electrode 506 are welded to the positive electrode lead electrode 510 and a negative electrode lead electrode 511, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside of the exterior body 509 without using lead electrodes.

Figure 9:
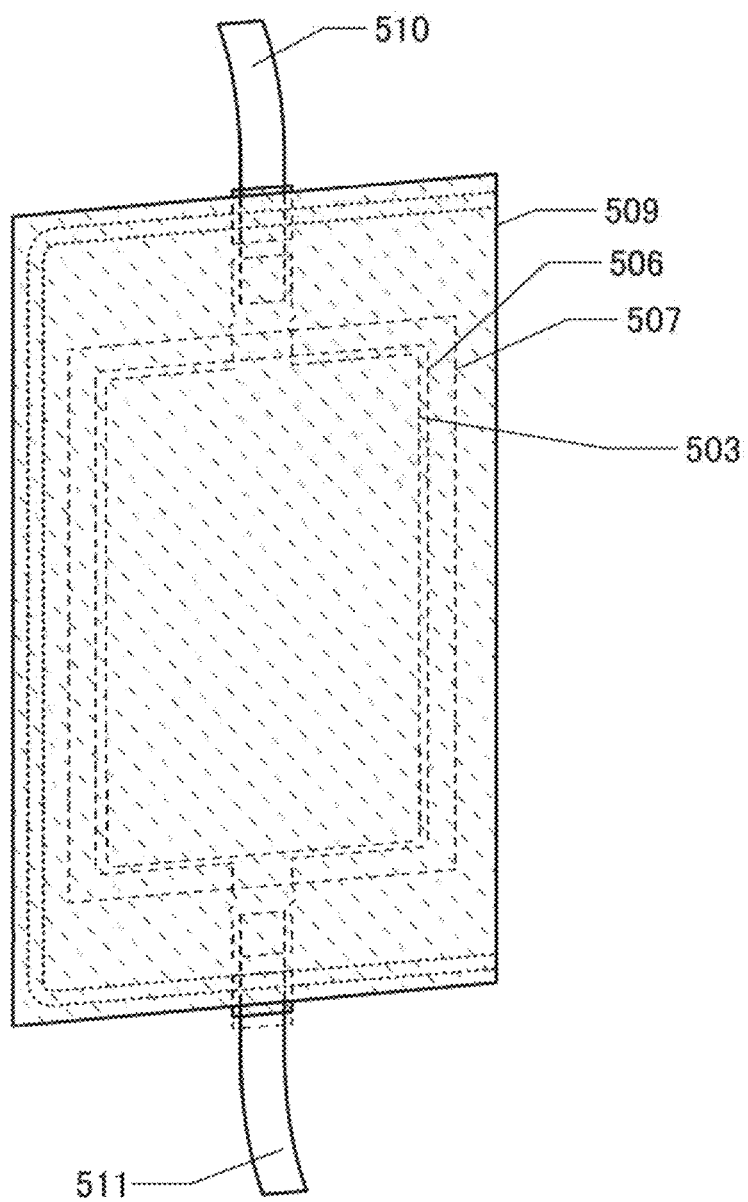
FIG. 9 illustrates a storage battery.

Although the positive electrode lead electrode 510 and the negative electrode lead electrode 511 are provided on the same side in FIG. 5, the positive electrode lead electrode 510 and the negative electrode lead electrode 511 may be provided on different sides as illustrated in FIG. 9. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 6A and 6B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of active material layers, the storage battery can have a high capacity. In contrast, in the case of using a small number of active material layers, the storage battery can have a small thickness and high flexibility.

In the above structure, the exterior body 509 of the storage battery can change its form such that the smallest curvature radius is greater than or equal to 3 mm and less than or equal to 30 mm, preferably greater than or equal to 3 mm and less than or equal to 10 mm. One or two films are used as the exterior body of the secondary battery. In the case of a storage battery having a layered structure, a cross-sectional structure of the battery that is bent is surrounded by two curves of the film serving as the exterior body.

Figure 10A:
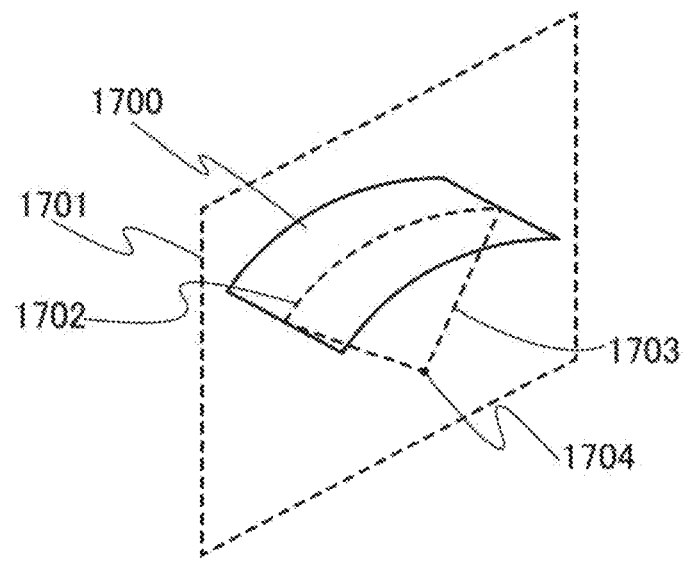
FIG. 10A to 10C illustrate the radius of curvature of a surface.
Figure 10B:
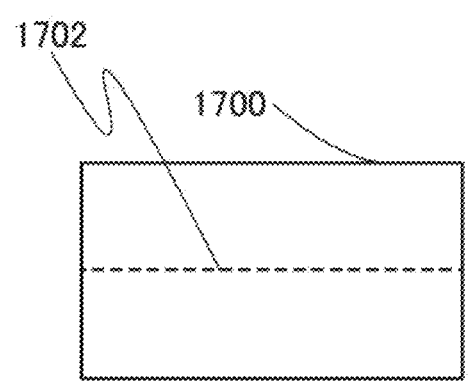
Figure 10C:
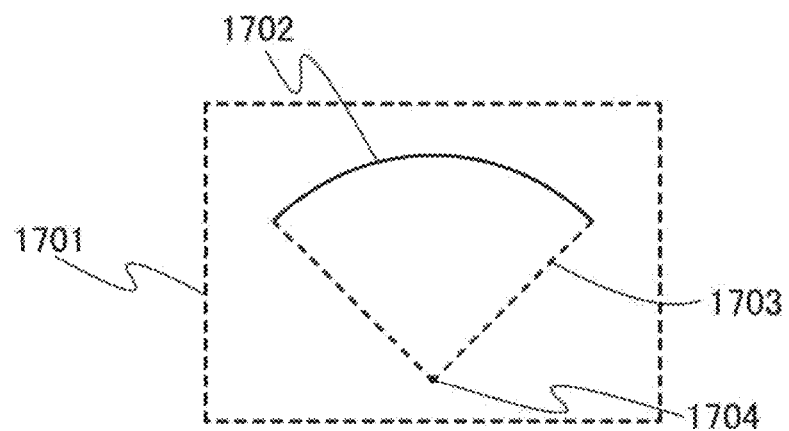

Description will be given of the radius of curvature of a surface with reference to FIGS. 10A to 10C. In FIG. 10A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 10B is a top view of the curved surface 1700. FIG. 10C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 11A:
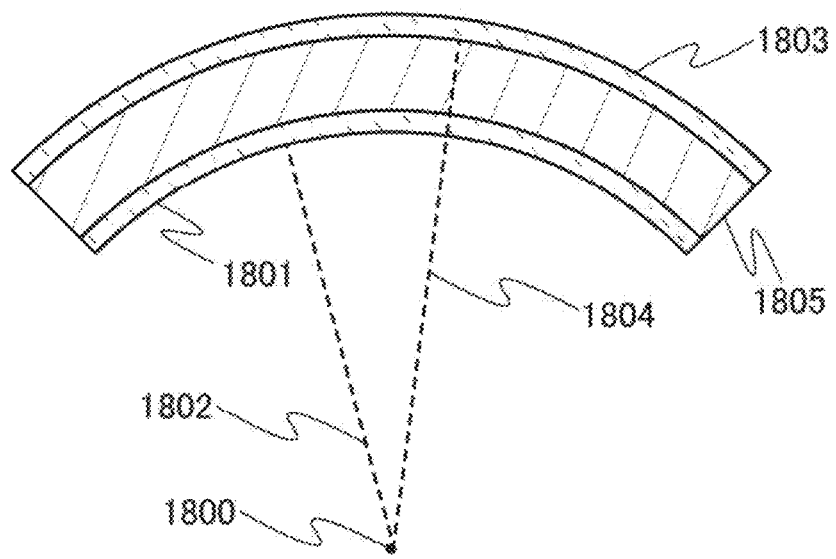
FIGS. 11A to 11D illustrate the radius of curvature of a film.
Figure 11B:
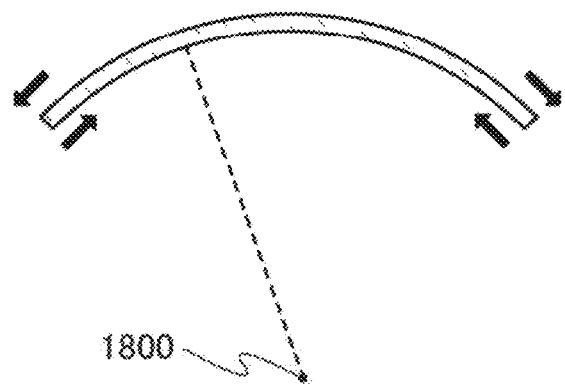

In the case of bending a secondary battery in which a component 1805 including electrodes, an electrolytic solution, and the like is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 11A). When the secondary battery is curved and has an arc-shaped cross section, compressive stress is applied to a surface of the film on the side closer to the center 1800 of curvature and tensile stress is applied to a surface of the film on the side further from the center 1800 of curvature (FIG. 11B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 11C:
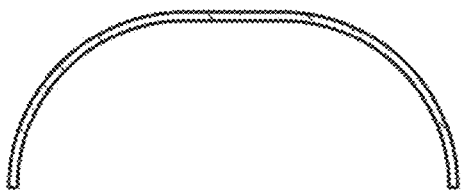
Figure 11D:
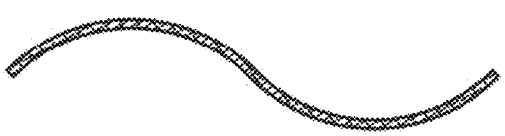

Note that the cross-sectional shape of the secondary battery is not limited to a simple arc shape, and the cross section can be partly arc-shaped; for example, a shape illustrated in FIG. 11C, a wavy shape illustrated in FIG. 11D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 14A:
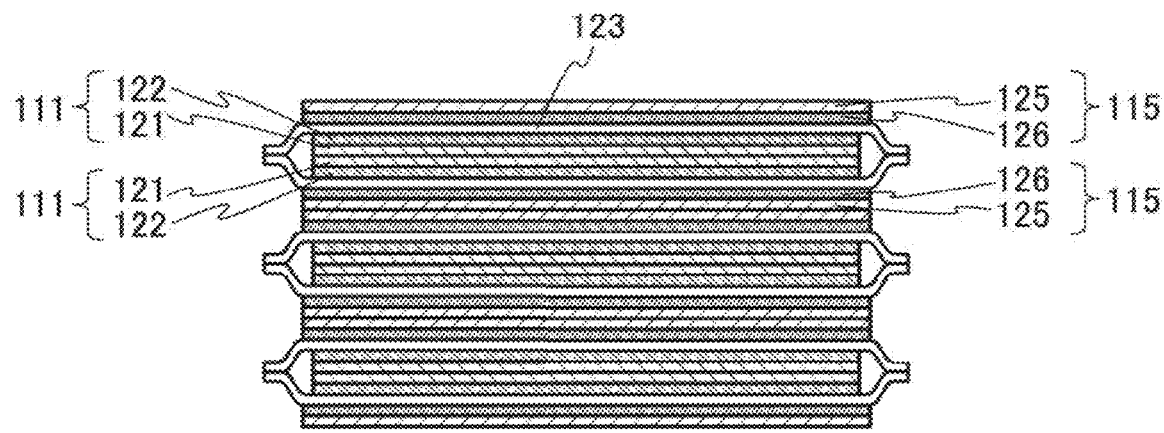
FIGS. 14A to 14C are each a part of a cross-sectional view of a storage battery.

FIG. 14A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 14A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the storage battery 500 is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other, thus, the stress due to the difference between the inner diameter and the outer diameter of a curved portion can be relieved. Here, the inner diameter of the curved portion refers to the radius of curvature of the inner surface of the curved portion in the exterior body 509 of the storage battery 500 in the case where the storage battery 500 is curved, for example. Therefore, the deterioration of the storage battery 500 can be inhibited. Furthermore, the storage battery 500 can have high reliability.

Figure 14B:
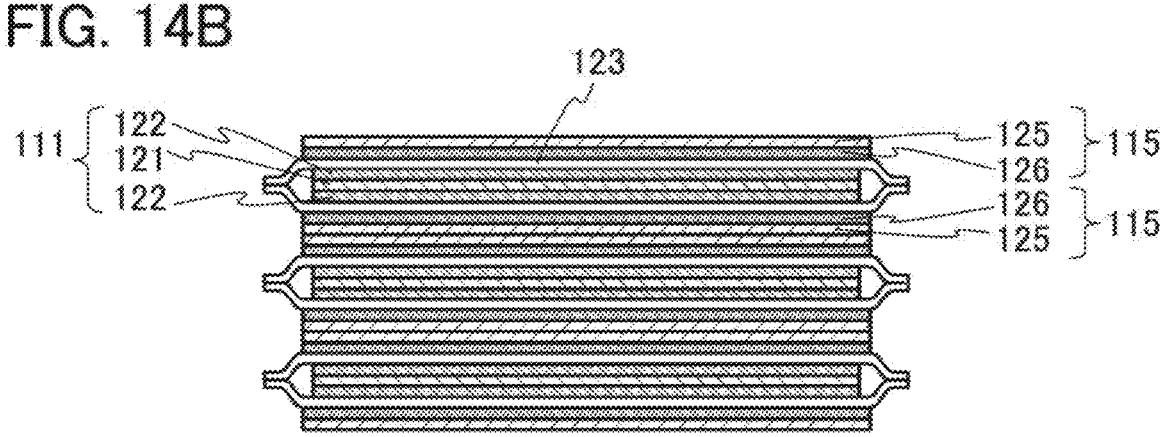

FIG. 14B illustrates an example of a stack of the positive electrodes 111 and the negative electrodes 115 which is different from that in FIG. 14A. The structure illustrated in FIG. 14B is different from that in FIG. 14A in that the positive electrode active material layers 122 are provided on both surfaces of the positive electrode current collector 121. When the positive electrode active material layers 122 are provided on both the surfaces of the positive electrode current collector 121 as illustrated in FIG. 14B, the capacity per unit volume of the storage battery 500 can be increased.

Figure 14C:
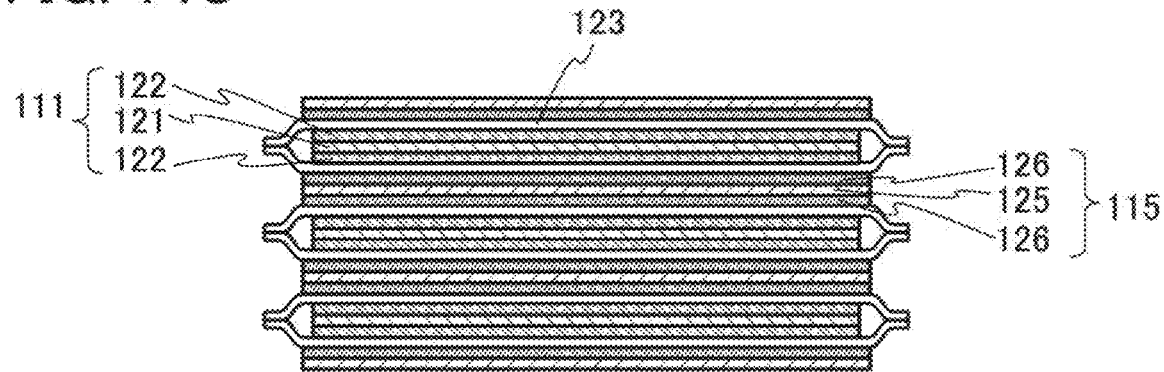

FIG. 14C illustrates an example of a stack of the positive electrodes 111 and the negative electrodes 115 which is different from that in FIG. 14B. The structure illustrated in FIG. 14C is different from that in FIG. 14B in that the negative electrode active material layers 126 are provided on both surfaces of the negative electrode current collector 125. When the negative electrode active material layers 126 are provided on both the surfaces of the negative electrode current collector 125 as illustrated in FIG. 14C, the capacity per unit volume of the storage battery 500 can be further increased.

Figure 15A:
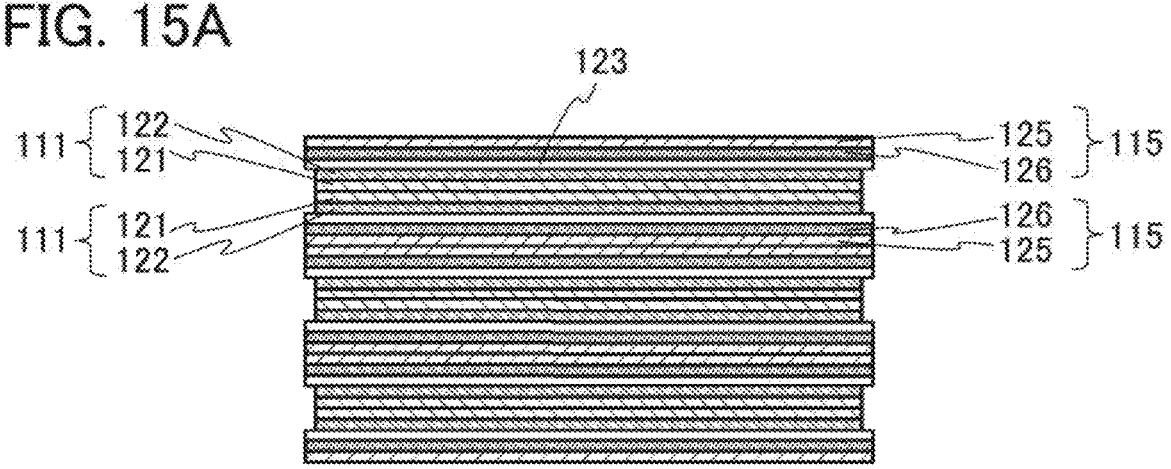
FIGS. 15A and 15B are each a part of a cross-sectional view of a storage battery.

In the structures illustrated in FIGS. 14A to 14C, a separator 123 has a bag-like shape by which the positive electrodes 111 are surrounded; however, one embodiment of the present invention is not limited thereto. FIG. 15A illustrates an example in which the separator 123 has a different structure from that in FIG. 14A. The structure illustrated in FIG. 15A is different from that in FIG. 14A in that the separator 123, which is sheet-like, is provided between every pair of the positive electrode active material layer 122 and the negative electrode active material layer 126. In the structure illustrated in FIG. 15A, six positive electrodes 111 and six negative electrodes 115 are stacked, and six separators 123 are provided.

Figure 15B:
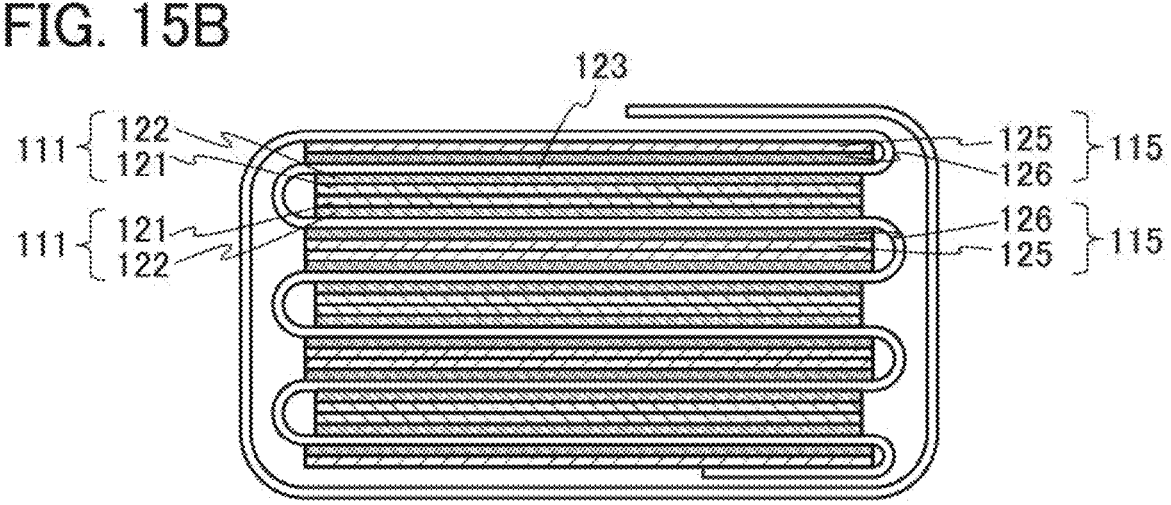

FIG. 15B illustrates an example in which the separator 123 different from that in FIG. 15A is provided. The structure illustrated in FIG. 15B is different from that in FIG. 15A in that one sheet of separator 123 is folded more than once to be interposed between every pair of the positive electrode active material layer 122 and the negative electrode active material layer 126. It can be said that the structure illustrated in FIG. 15B is a structure in which the separators 123 in the respective layers which are illustrated in FIG. 15A are extended and connected together between the layers. In the structure of FIG. 15B, six positive electrodes II and six negative electrodes 115 are stacked and thus the separator 123 needs to be folded at least five times. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 16A:
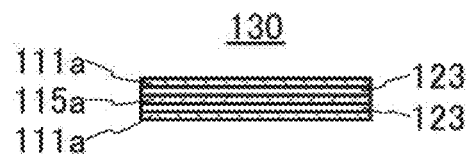
FIGS. 16A to 16C are each a part of a cross-sectional view of a storage battery.
Figure 16B:
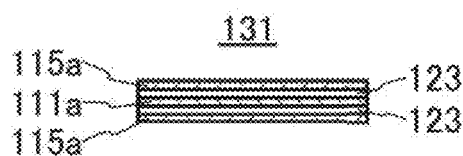
Figure 16C:
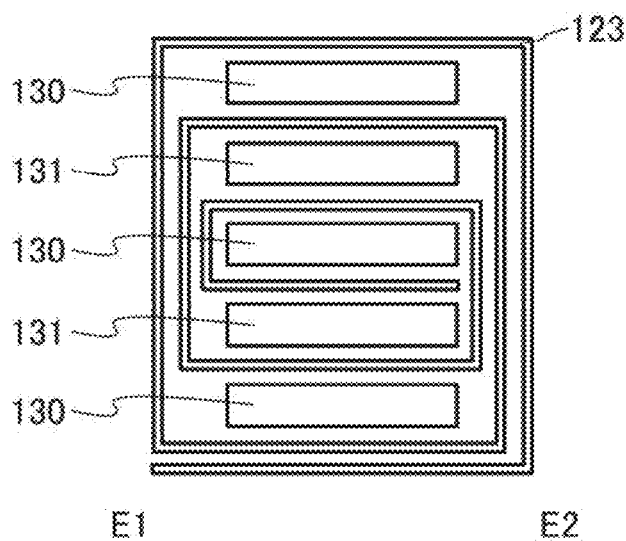

Note that the positive electrode, the negative electrode, and the separator may be stacked as illustrated in FIGS. 16A to 16C. FIG. 16A is a cross-sectional view of a first electrode assembly 130, and FIG. 16B is a cross-sectional view of a second electrode assembly 131. FIG. 16C is a cross-sectional view taken along the dashed-dotted line A1-A2 in FIG. 5. In FIG. 16C, the first electrode assembly 130, the second electrode assembly 131, and the separator 123 are selectively illustrated for the sake of clarity.

As illustrated in FIG. 16C, the storage battery 500 includes a plurality of first electrode assemblies 130 and a plurality of second electrode assemblies 131.

As illustrated in FIG. 16A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 16B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 16C, the plurality of first electrode assemblies 130 and the plurality of second electrode assemblies 131 are covered with the wound separator 123.

[Coin-Type Storage Battery]

Figure 12A:
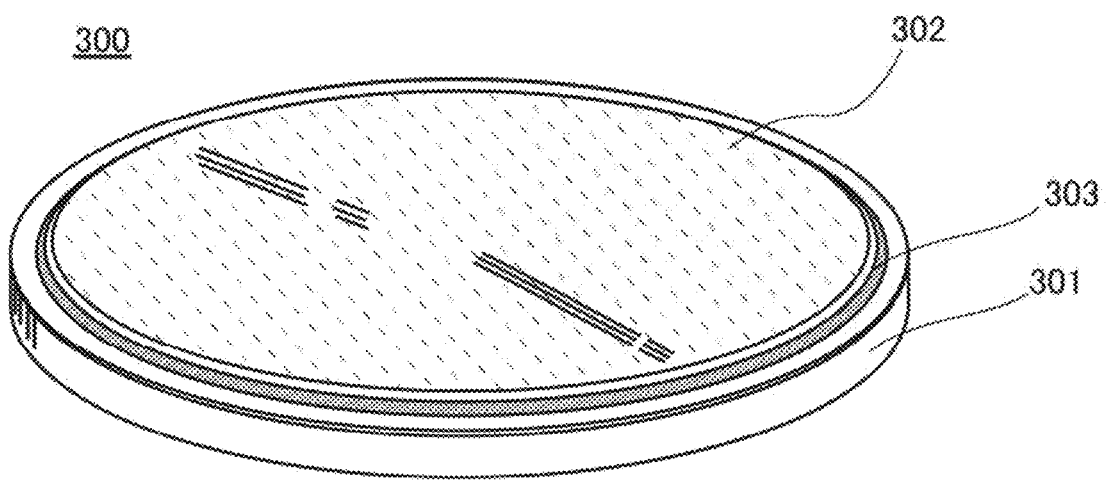
FIGS. 12A and 12B illustrate a coin-type storage battery.
Figure 12B:
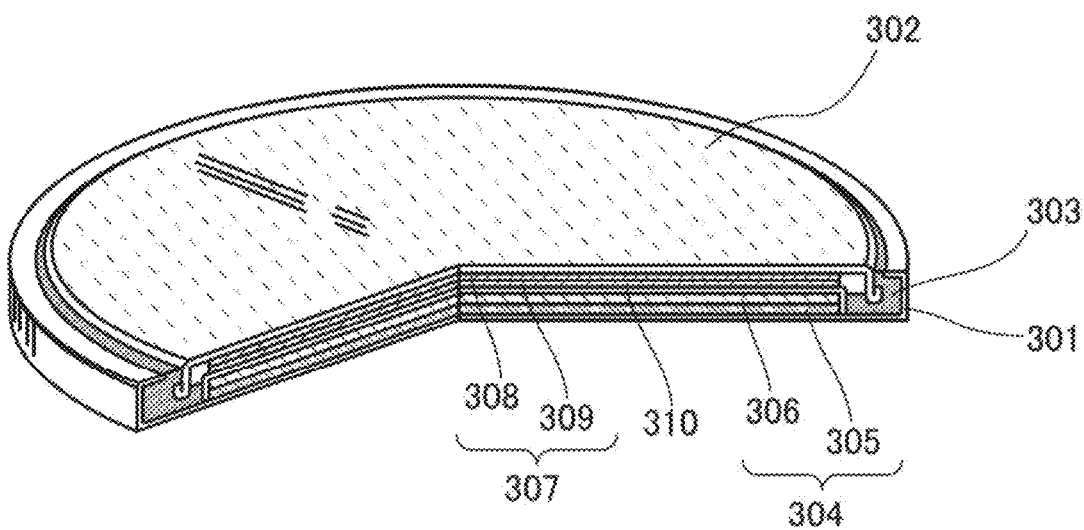

Next, an example of a coin-type storage battery will be described as an example of a power storage device with reference to FIGS. 12A and 12B. FIG. 12A is an external view of a coin-type (single-layer flat type) storage battery, and FIG. 12B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for a separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 12B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 13A:
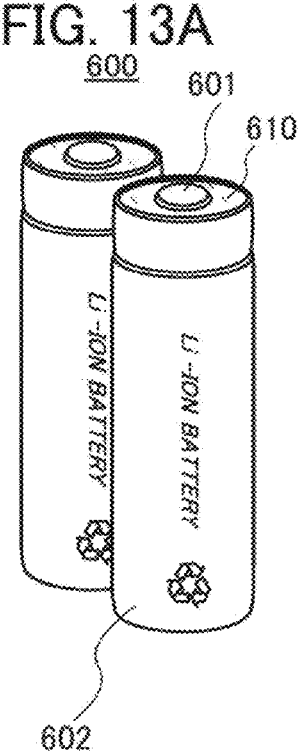
FIGS. 13A and 13B illustrate a cylindrical storage battery.

Next, an example of a cylindrical storage battery will be described as an example of a power storage device with reference to FIGS. 13A and 13B. As illustrated in FIG. 13A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 13B:
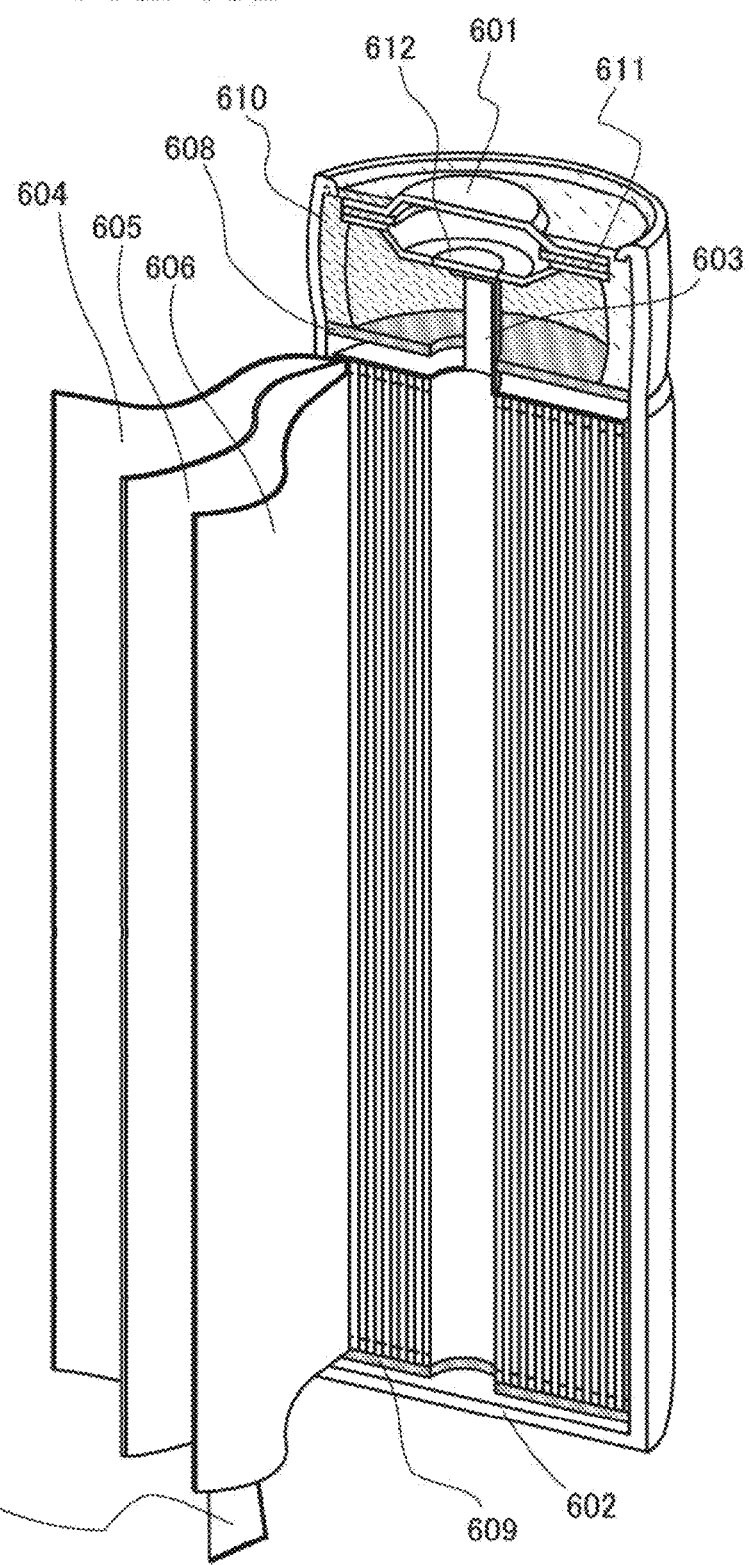

FIG. 13B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a separator 605 interposed therebetween is provided. Although not illustrated, the battery element is wound around a center pin. One end of the battery can 602 is closed and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element. As the nonaqueous electrolytic solution, a nonaqueous electrolytic solution that is similar to those of the coin-type storage battery can be used.

The description of the positive electrode 503 can be referred to for the positive electrode 604. The description of the negative electrode 506 can be referred to for the negative electrode 606. The description of the method for fabricating an electrode that is described in Embodiment 2 can be referred to for the positive electrode 604 and the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The FTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 13A and 13B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 17A to 17C to FIGS. 21A and 21B illustrate examples of other storage batteries.

[Structural Example of Thin Storage Battery]

FIGS. 17A to 17C and FIGS. 18A to 18C illustrate structural examples of thin storage batteries. A wound body 993 illustrated in FIG. 17A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 17A:
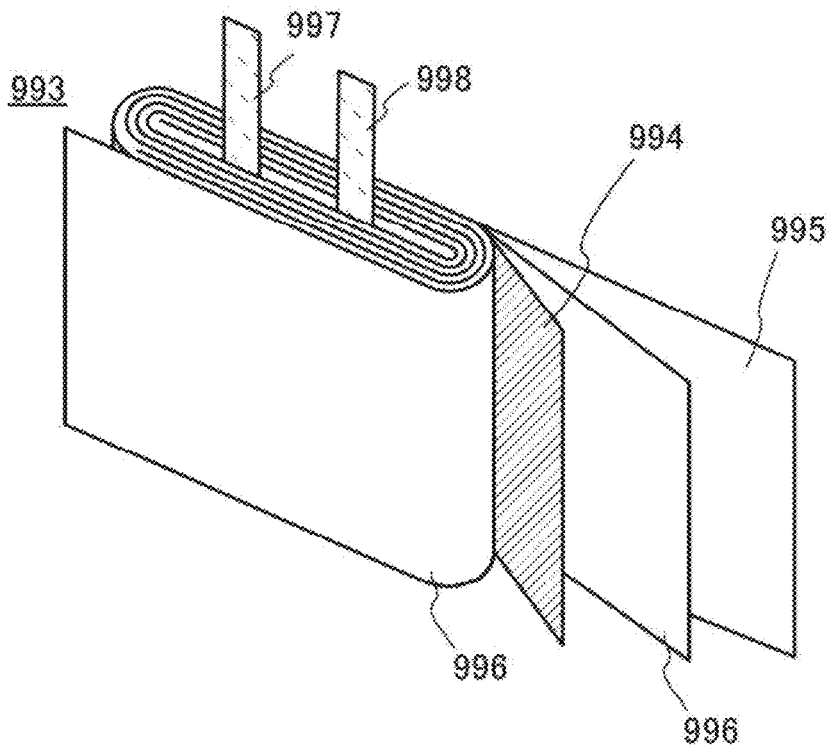
FIGS. 17A to 17C illustrate an example of a storage battery.
Figure 17B:
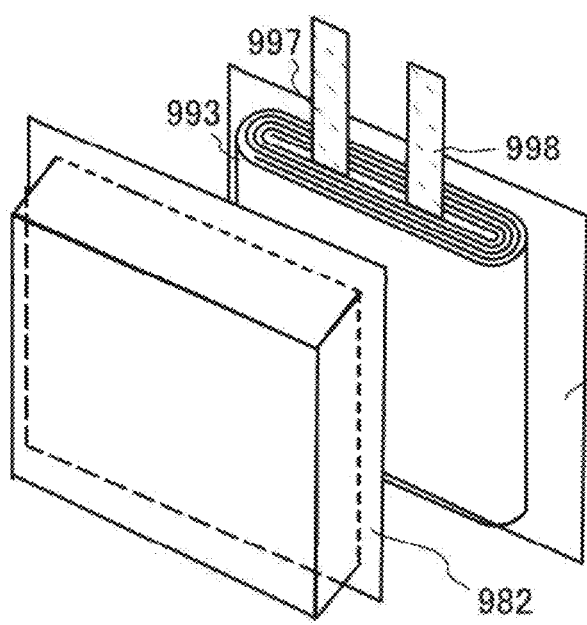
Figure 17C:
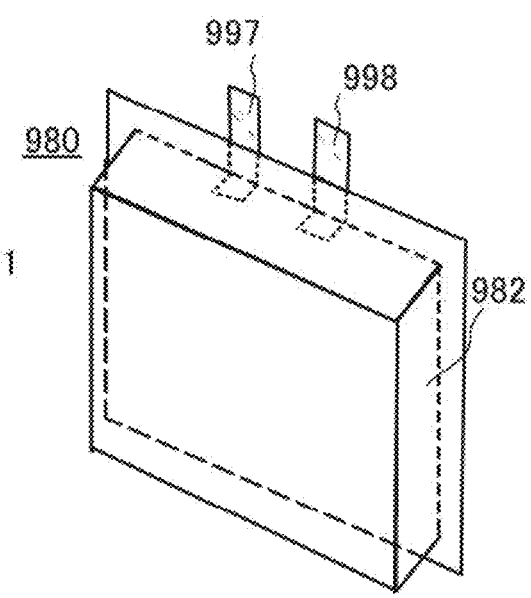

In a storage battery 990 illustrated in FIGS. 17B and 17C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 17B and 17C illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 18B and 18C illustrate another example of a flexible thin storage battery. The wound body 993 illustrated in FIG. 18A is the same as that illustrated in FIG. 17A, and the detailed description thereof is omitted.

In the storage battery 990 illustrated in FIGS. 18B and 18C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

[Structural Example of Power Storage System]

Structural examples of power storage systems will be described with reference to FIGS. 19A and 19B to FIGS. 21A and 21B. Here, a power storage system refers to, for example, a device including a power storage device.

Figure 19A:
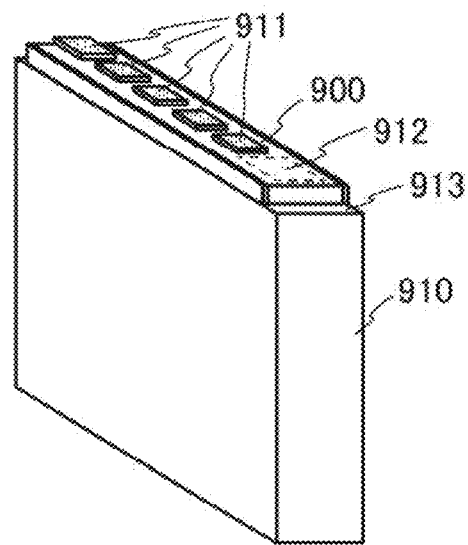
FIGS. 19A and 19B illustrate an example of a power storage system.
Figure 19B:
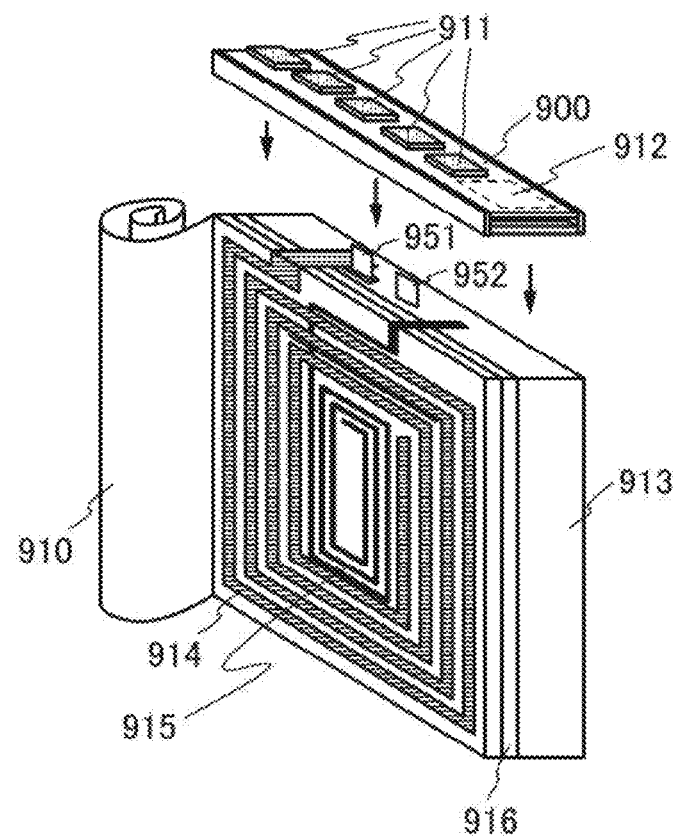

FIGS. 19A and 19B are external views of a power storage system. The power storage system includes a circuit board 900 and a storage battery 913. A label 910 is attached to the storage battery 913. As shown in FIG. 19B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 19A and 19B.

For example, as shown in FIGS. 20A1 and 20A2, two opposite surfaces of the storage battery 913 in FIGS. 19A and 19B may be provided with respective antennas. FIG. 20A1 is an external view showing one side of the opposite surfaces, and FIG. 20A2 is an external view showing the other side of the opposite surfaces. For portions similar to those in FIGS. 19A and 19B, the description of the power storage system illustrated in FIGS. 19A and 19B can be referred to as appropriate.

As illustrated in FIG. 20A1, the antenna 914 is provided on one of the opposite surfaces of the storage battery 913 with the layer 916 interposed therebetween, and as illustrated in FIG. 20A2, the antenna 915 is provided on the other of the opposite surfaces of the storage battery 913 with a layer 917 interposed therebetween. The layer 917 has a function of blocking an electromagnetic field by the storage battery 913, for example. As the layer 917, for example, a magnetic body can be used.

With the above structure, both of the antennas 914 and 915 can be increased in size.

Alternatively, as illustrated in FIGS. 20B1 and 20B2, two opposite surfaces of the storage battery 913 in FIGS. 19A and 19B may be provided with different types of antennas. FIG. 20B1 is an external view showing one side of the opposite surfaces, and FIG. 20B2 is an external view showing the other side of the opposite surfaces. For portions similar to those in FIGS. 19A and 19B, the description of the power storage system illustrated in FIGS. 19A and 19B can be referred to as appropriate.

As illustrated in FIG. 20B1, the antennas 914 and 915 are provided on one of the opposite surfaces of the storage battery 913 with the layer 916 interposed therebetween, and as illustrated in FIG. 20B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 21A:
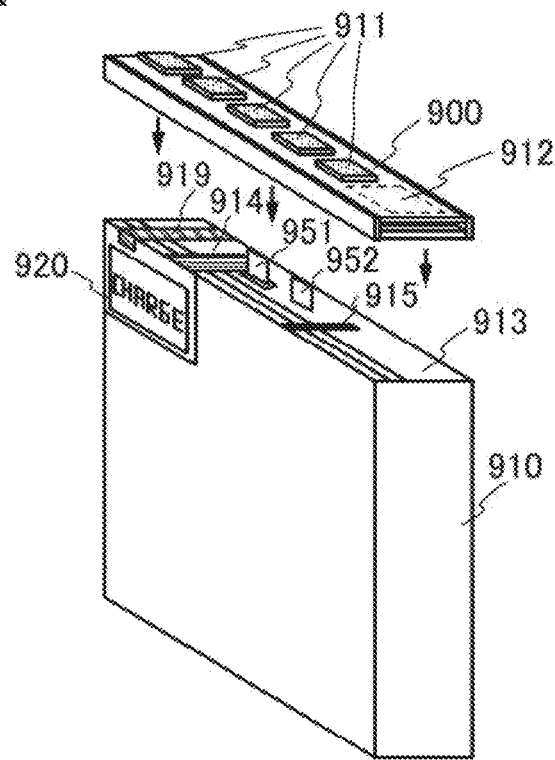
FIGS. 21A and 21B each illustrate an example of a power storage system.

Alternatively, as illustrated in FIG. 21A, the storage battery 913 in FIGS. 19A and 19B may be provided with a display device 920. The display device 920 is electrically connected to the terminal 911 via a terminal 919. It is possible that the label 910 is not provided in a portion where the display device 920 is provided. For portions similar to those in FIGS. 19A and 19B, the description of the power storage system illustrated in FIGS. 19A and 19B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 21B:
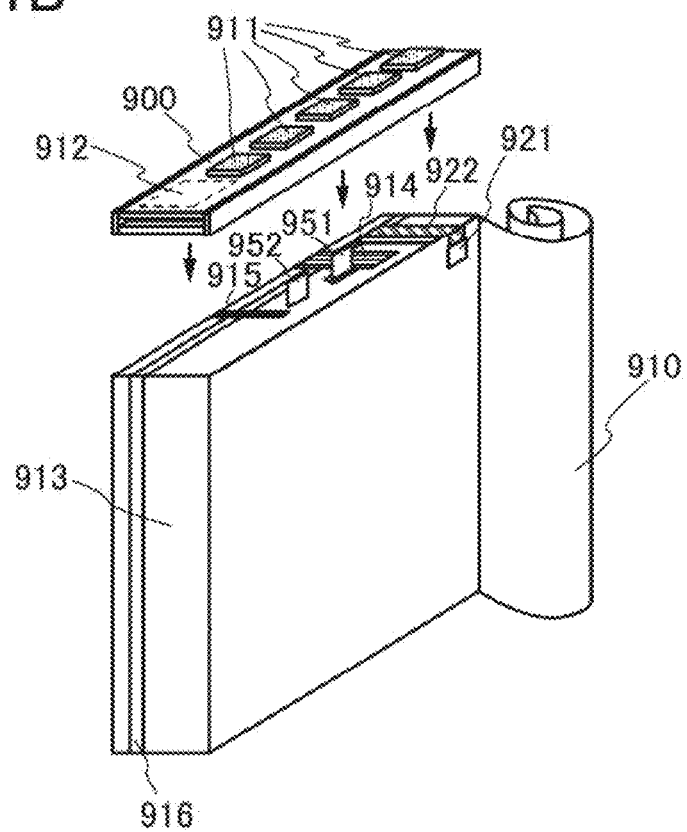

Alternatively, as illustrated in FIG. 21B, the storage battery 913 illustrated in FIGS. 19A and 19B may be provided with a sensor 921. The sensor 921 is electrically connected to the terminal 911 via a terminal 922. For portions similar to those in FIGS. 19A and 19B, the description of the power storage system illustrated in FIGS. 19A and 19B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 4

In this embodiment, an example of an electronic device including a flexible power storage device will be described.

FIGS. 22A to 22G illustrate examples of electronic devices including the flexible power storage devices described in Embodiment 3. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 22A:
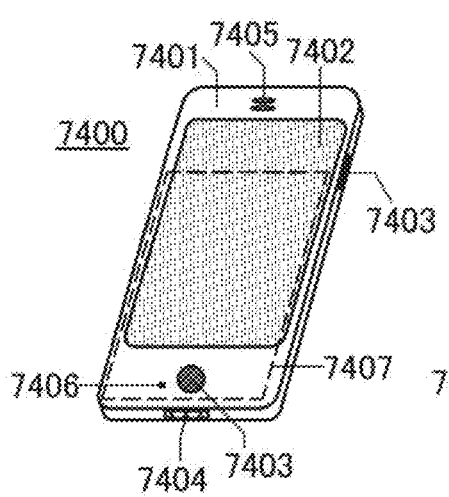
FIGS. 22A to 22G illustrate examples of electronic devices.

FIG. 22A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 22B:
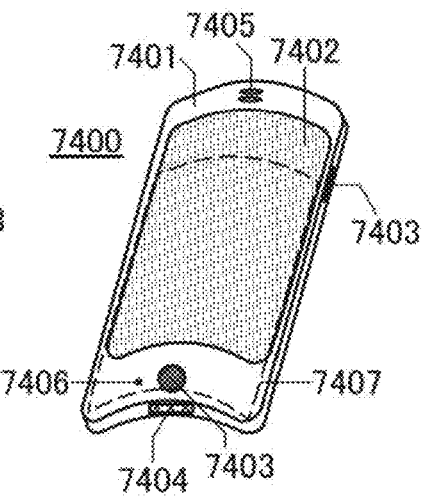
Figure 22C:
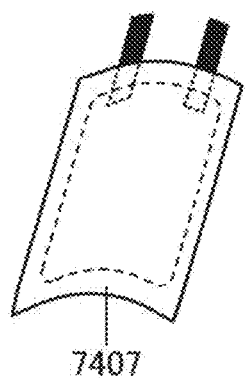

FIG. 22B illustrates the mobile phone 7400 that is bent. When the whole mobile phone 7400 is bent by the external force, the power storage device 7407 included in the mobile phone 7400 is also bent. FIG. 22C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 22D:
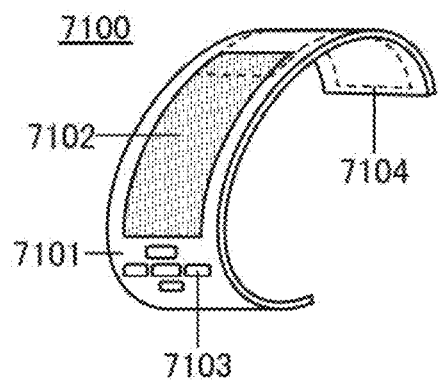
Figure 22E:
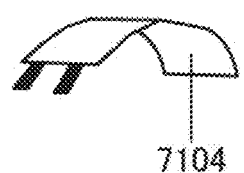

FIG. 22D illustrates an example of a bangle display device. A portable display device 7100 includes a housing 7101, a display portion 7102, an operation button 7103, and a power storage device 7104. FIG. 22E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 22F:
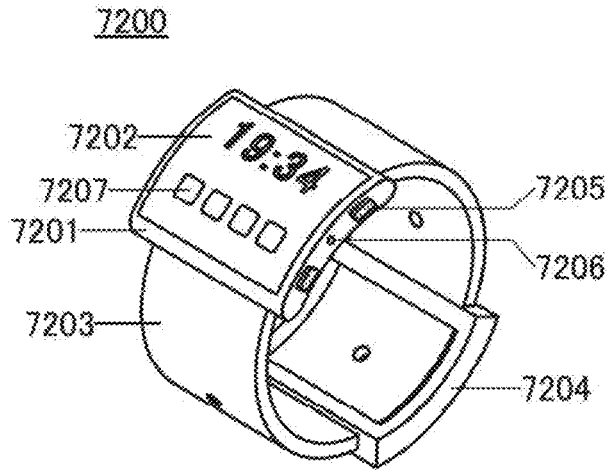

FIG. 22F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 22E that is in the state of being curved can be provided in the housing 7201. Alternatively, the power storage device 7104 illustrated in FIG. 22E can be provided in the band 7203 such that it can be curved.

The portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 22G:
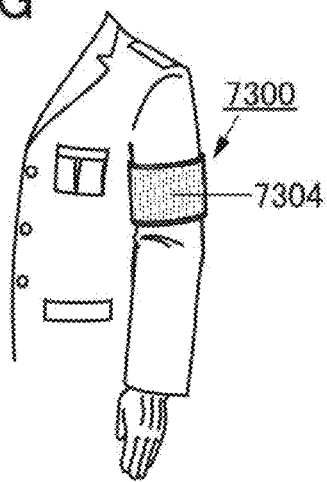

FIG. 22G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be combined with any of the other embodiments as appropriate.

Embodiment 5

In this embodiment, examples of electronic devices that can include power storage devices will be described.

Figure 23A:
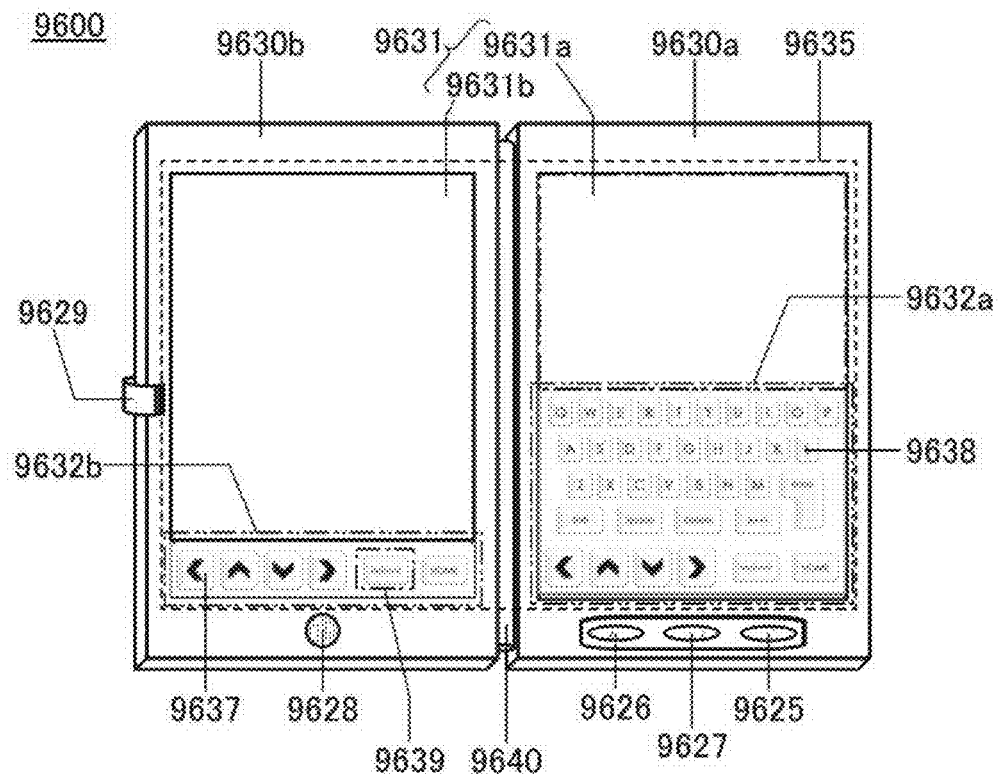
FIGS. 23A to 23C illustrate examples of electronic devices.
Figure 23B:
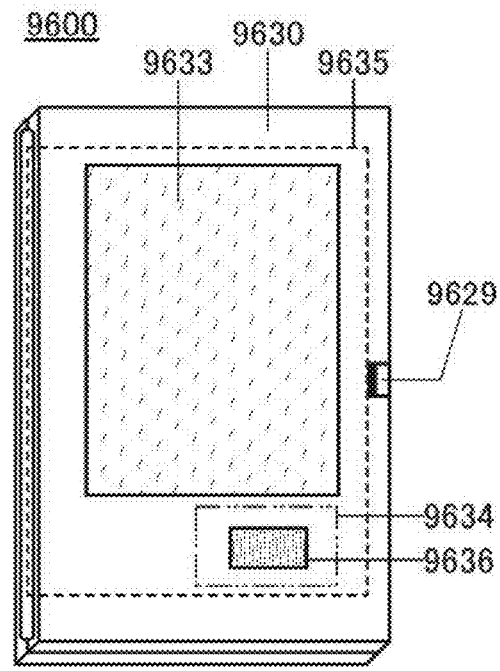

FIGS. 23A and 23B illustrate an example of a tablet terminal that can be folded in half. A tablet terminal 9600 illustrated in FIGS. 23A and 23B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 23A illustrates the tablet terminal 9600 that is opened, and FIG. 23B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631 can be used as a display screen.

In the display portion 9631*b*, as in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope sensor or an acceleration sensor, may be incorporated in the tablet terminal.

Although the display portion 9631*a* and the display portion 9631 have the same display area in FIG. 23A, one embodiment of the present invention is not limited to this example. The display portion 9631*a* and the display portion 9631*b* may have different display areas or different display quality. For example, one of the display portions 9631*a* and 9631*b* may display higher definition images than the other.

The tablet terminal is closed in FIG. 23B. The tablet terminal includes a housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 23A and 23B can also have a function of displaying various types of data (e.g., a still image, a moving image, and a text image), a function of displaying a calendar, a date, or the time on the display portion, a touch-input function of operating or editing data displayed on the display portion by touch input, a function of controlling processing by various types of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium ion battery as the power storage unit 9635 brings an advantage such as reduction in size.

Figure 23C:
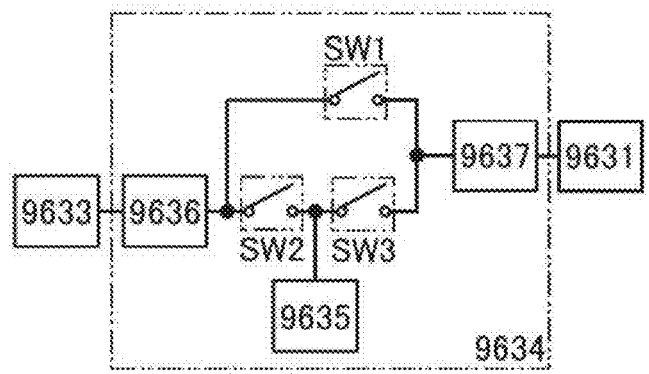

The structure and operation of the charge and discharge control circuit 9634 illustrated in FIG. 23B will be described with reference to a block diagram in FIG. 23C. The solar cell 9633, the power storage unit 9635, the DCDC converter 9636, a converter 9637, switches SW1 to SW3, and the display portion 9631 are illustrated in FIG. 23C, and the power storage unit 9635, the DCDC converter 9636, the converter 9637, and the switches SW1 to SW3 correspond to the charge and discharge control circuit 9634 in FIG. 23B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 24:
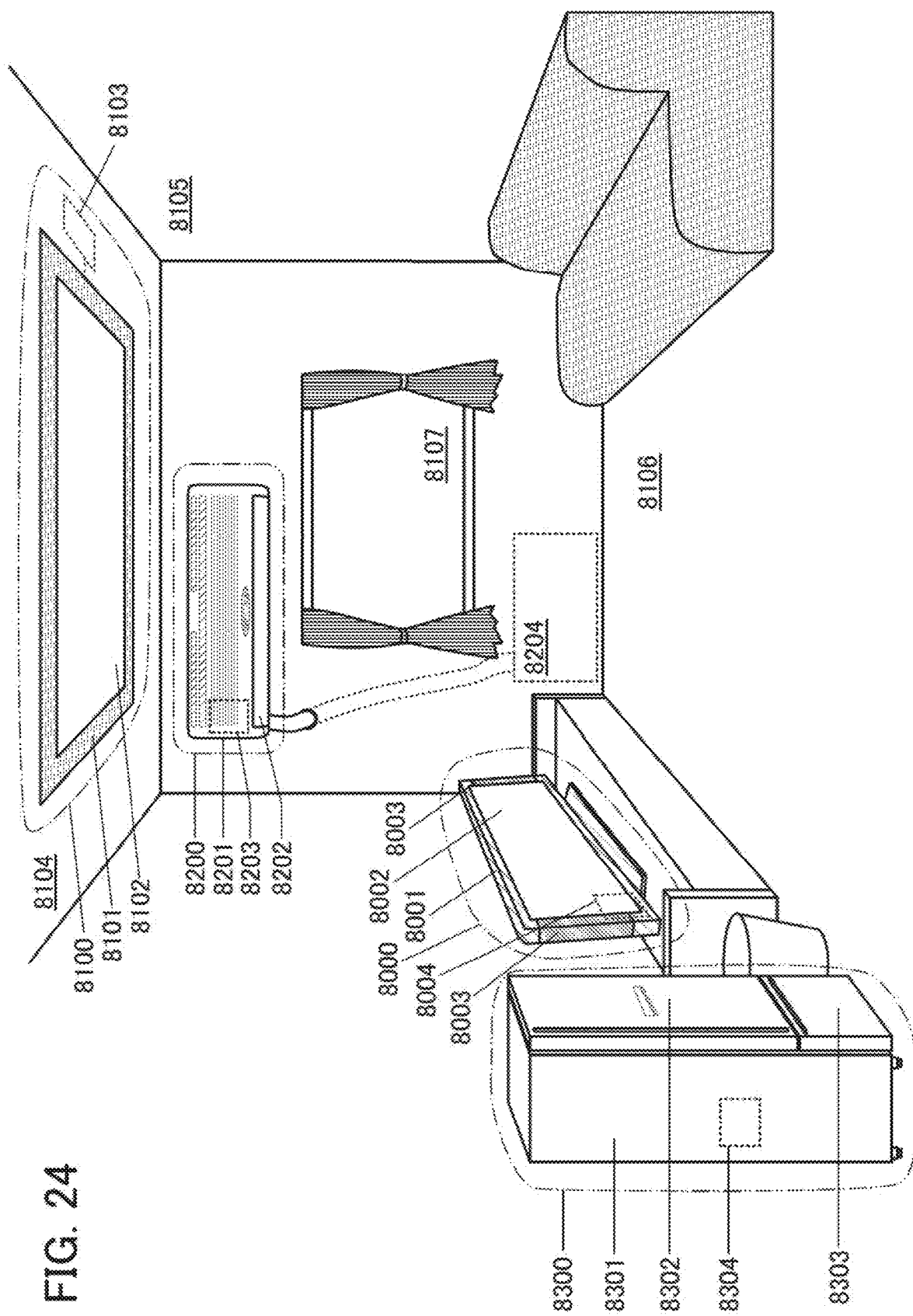
FIG. 24 illustrates examples of electronic devices.

FIG. 24 illustrates other examples of electronic devices. In FIG. 24, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 24, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 24 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 24 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 24, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 24 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 24 as an example, the power storage device of one embodiment of the present invention can be used in an air conditioner in which the functions of an indoor unit and an outdoor unit are integrated in one housing.

In FIG. 24, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 24. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 6

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 25A:
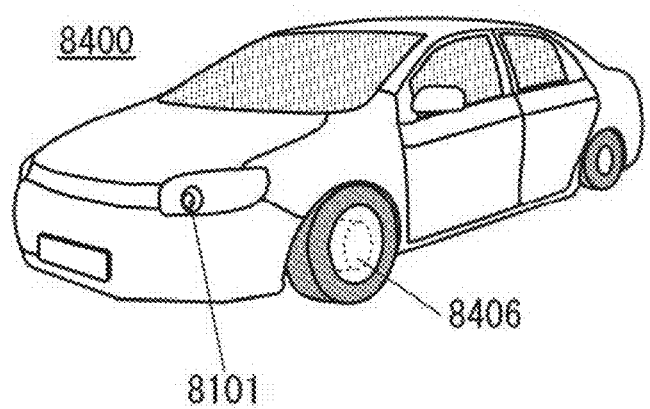
FIGS. 25A and 25B illustrate examples of electronic devices.
Figure 25B:
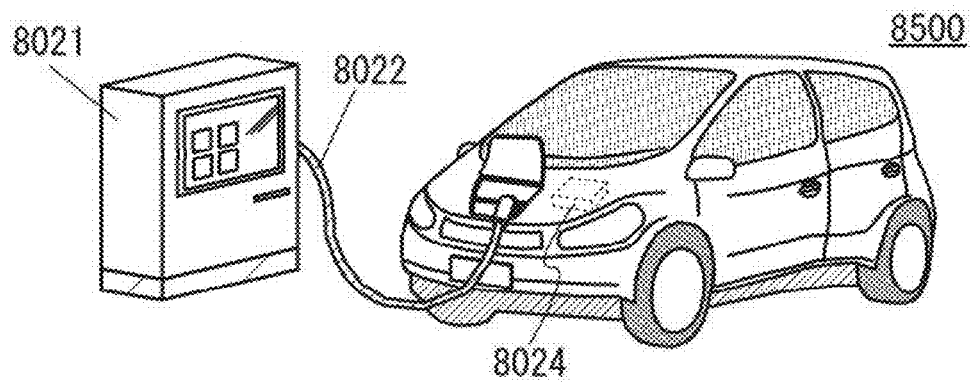
Figure 26A:
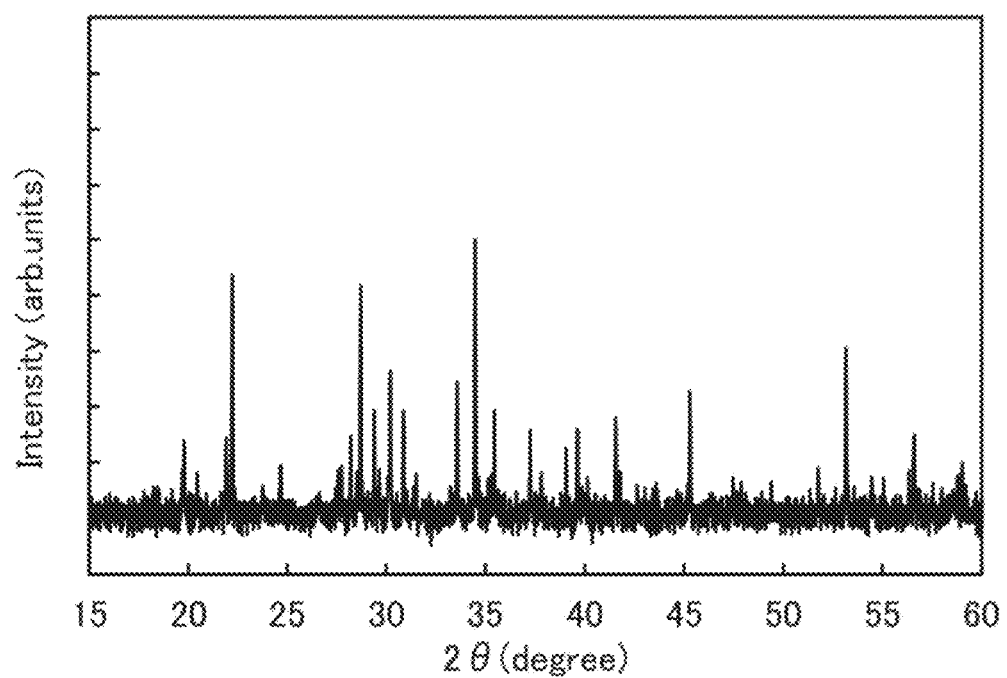
FIGS. 26A and 26B show XRD evaluation results.
Figure 26B:
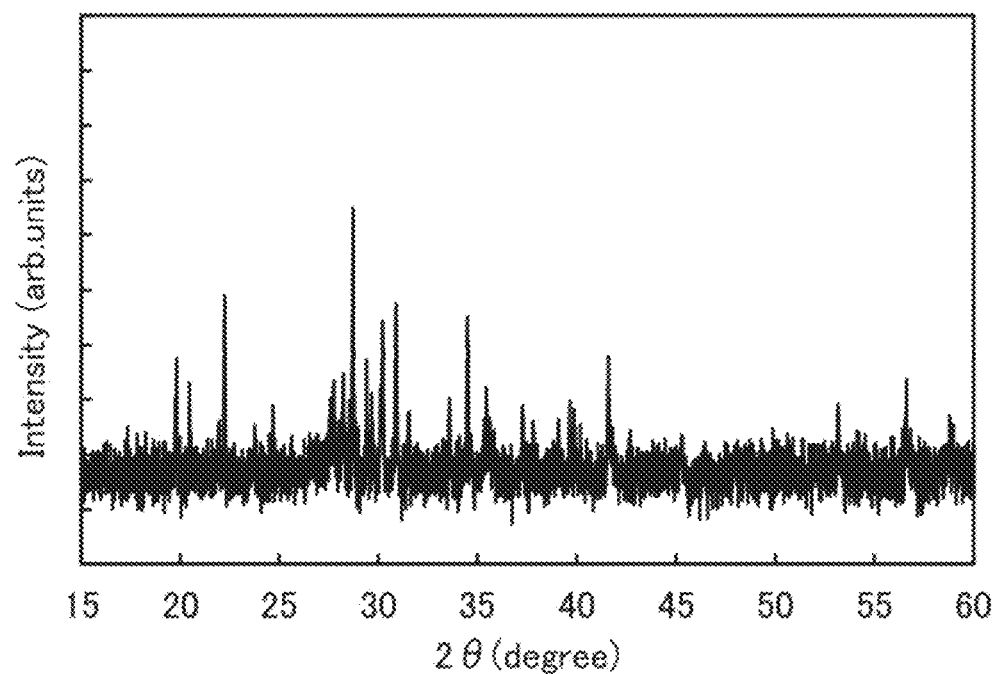

FIGS. 25A and 25B each illustrate an example of a vehicle using one embodiment of the present invention. An automobile 8400 illustrated in FIG. 25A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 25B illustrates an automobile 8500 including the power storage device. The automobile 8500 can be charged when the power storage device is supplied with electric power through external charging equipment by a plug-in system, a contactless power feeding system, or the like. In FIG. 25B, a power storage device 8024 included in the automobile 8500 is charged with the use of a ground-based charging apparatus 8021 through a cable 8022. In charging a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle performance and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the mileage. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, a manufacturing method, analysis results, and the like of the lithium-containing complex phosphate of one embodiment of the present invention will be described.
<Manufacturing Synthetic Material>

The lithium-containing complex phosphate was manufactured on the basis of the flowchart shown in FIG. 2.

As the lithium compound, LiCl was weighed to be 6.359 g in Step S201$a$. As the phosphorus compound, $H_3PO_4$ was weighed to be 3.41 ml in Step S201$b$. The number of moles of lithium was set to be three times that of phosphorus. As the solvent, water was weighed to be 50 ml in Step S201$d$.

Then, LiCl and $H_3PO_4$ were put into water, so that the mixed solution A was formed in Step S205. Step S205 was performed in an air atmosphere. Note that while being stirred with a stirring means or the like, materials and the like were put into water during the formation of the mixed solution.

Then, as the solution Q, ammonia water with a concentration of 28 wt % was prepared in Step S205$b$.

After that, the solution Q was dropped into the mixed solution A and pH measurement was performed in Step S207. The solution Q is dropped until pH becomes a desired one, so that the mixed solution B was formed. Here, several types of mixed solutions B with different pH were prepared. For pH measurement, a SevenGo Duo pH meter produced by Mettler-Toledo International Inc. was used.

Then, as the M(II) compound, $FeCl_2 \cdot 4H_2O$ was weighed to be 9.941 g in Step S208. The number of moles of iron was equal to that of phosphorus. As the solvent, water was weighed in Step S209$d$.

After that, each of the several types of mixed solutions B with different pH was mixed with the mixed solution B, $FeCl_2 \cdot 4H_2O$, and water, so that 16 types of solutions in Table 1 were formed as the mixed solution C in Step S209. Table 1 shows pH of the mixed solution after Step S207 (mixed solution B), pH after Step S209 (mixed solution C), and pH after Step S211 which will be described later.

TABLE 1

|  | after Step S207 | after Step S209 | after Step S211 |
|---|---|---|---|
| Condition 1 | 3.99 | 2.91 | 2.42 |
| Condition 2 | 5.00 | 3.81 | 3.48 |
| Condition 3 | 6.03 | 4.75 | 4.00 |
| Condition 4 | 7.01 | 5.29 | 4.84 |
| Condition 5 | 8.09 | 6.02 | 5.06 |
| Condition 6 | 10.00 | 9.31 | 9.40 |
| Condition 7 | 3.99 | 2.78 | 1.81 |
| Condition 8 | 5.00 | 3.45 | 4.24 |
| Condition 9 | 6.02 | 4.97 | 4.31 |
| Condition 10 | 7.94 | 5.81 | 5.01 |
| Condition 11 | 9.01 | 7.76 | 7.84 |
| Condition 12 | 10.00 | 9.43 | 9.09 |
| Condition 13 | 6.03 | 3.92 | 3.39 |
| Condition 14 | 7.07 | 5.2 | 3.64 |
| Condition 15 | 8.16 | 6.5 | 6.15 |
| Condition 16 | 9.99 | 9.42 | 9.34 |

Then, the mixed solution C was put into an autoclave including an inner cylinder made of fluororesin and the mixed solution C was heated at 110° C. for 1 hour as Conditions 1 to 6, at 120° C. for 1 hour as Conditions 7 to 12, and at 150° C. for 1 hour as Conditions 13 to 16 in Table 1. During heating, the pressure inside the inner cylinder was approximately 0.1 MPa to 0.15 MPa at 110° C. and approximately 0.4 MPa to 0.5 MPa at 150° C. After the heat treatment was performed, the heated mixed solution C was left until the temperature fell and the synthetic material inside the inner cylinder was filtered and the residue was washed with water. As the autoclave, a mini reactor MS200-C manufactured by OM Lab-Tech Co., Ltd. was used.

Subsequently, the obtained substance was dried in a reduced-pressure atmosphere at 60° C. for two hours, so that a synthetic material A was obtained.

<XRD Measurement>

The obtained synthetic material A was measured by the XRD θ-2θ method. For the measurement, a D8 ADVANCE manufactured by Bruker AXS was used.

Figure 27A:
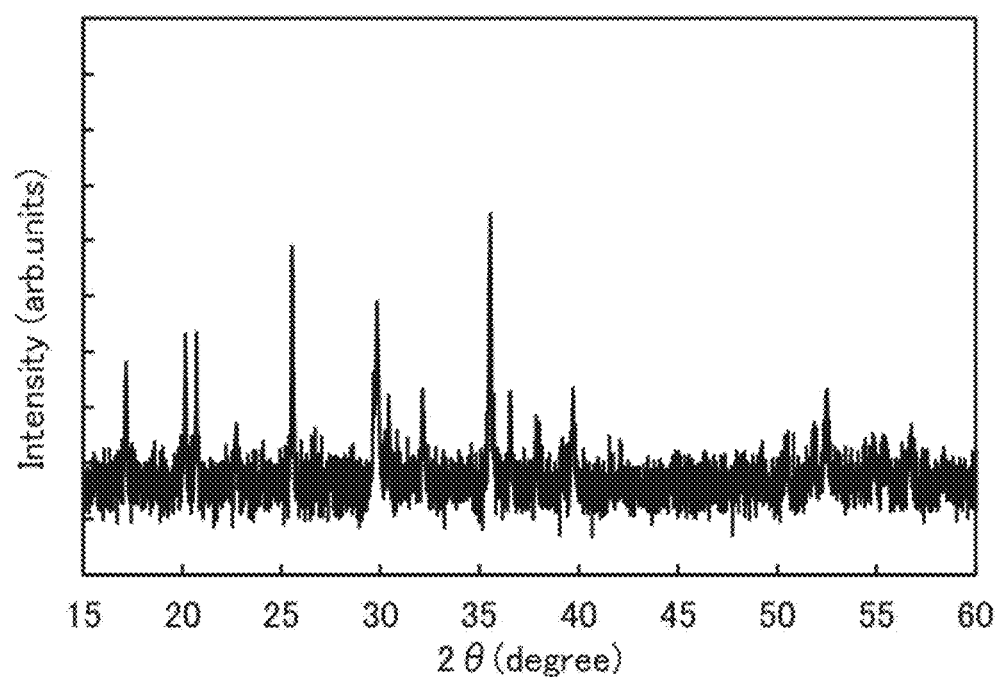
FIGS. 27A and 27B show XRD evaluation results.
Figure 27B:
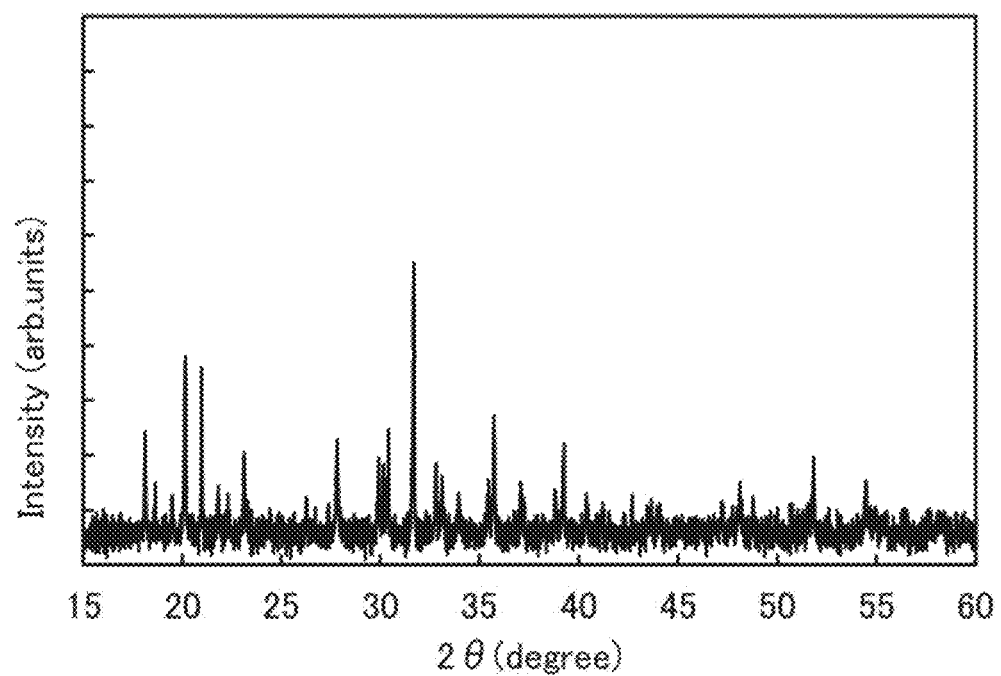
Figure 29B:
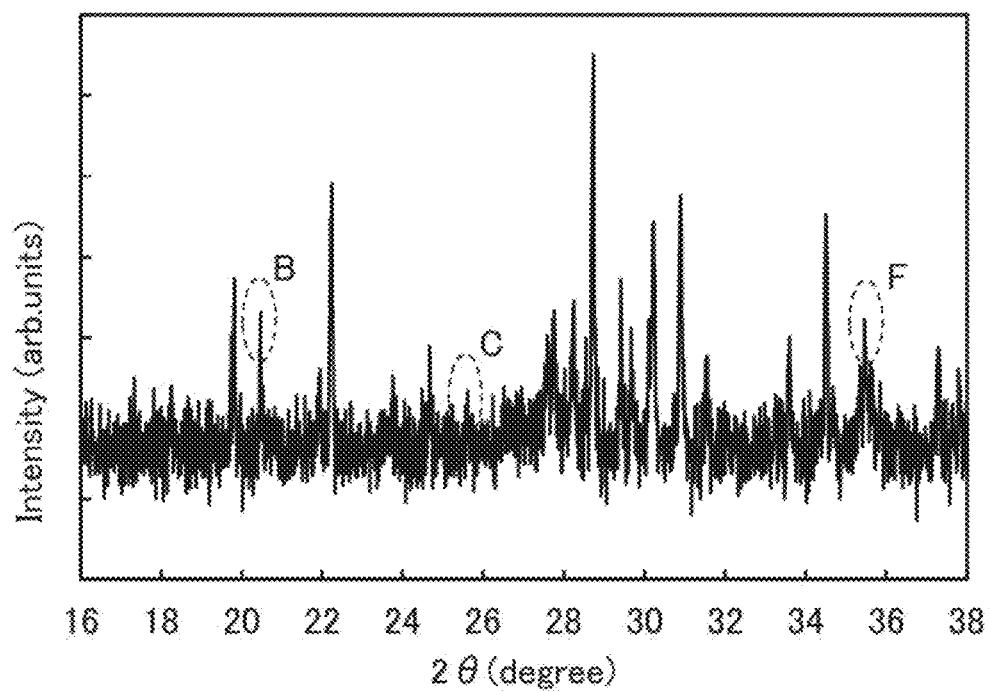

The XRD measurement results of the synthetic materials A obtained under Conditions 1, 2, 3, 4, 5, and 6 are shown in FIGS. 26A, 26B, 27A, 27B, 28A, and 28B, respectively. Further, FIG. 29A is a partial enlarged graph of FIG. 27A and FIG. 29B is a partial enlarged graph of FIG. 26B.

Figure 30:
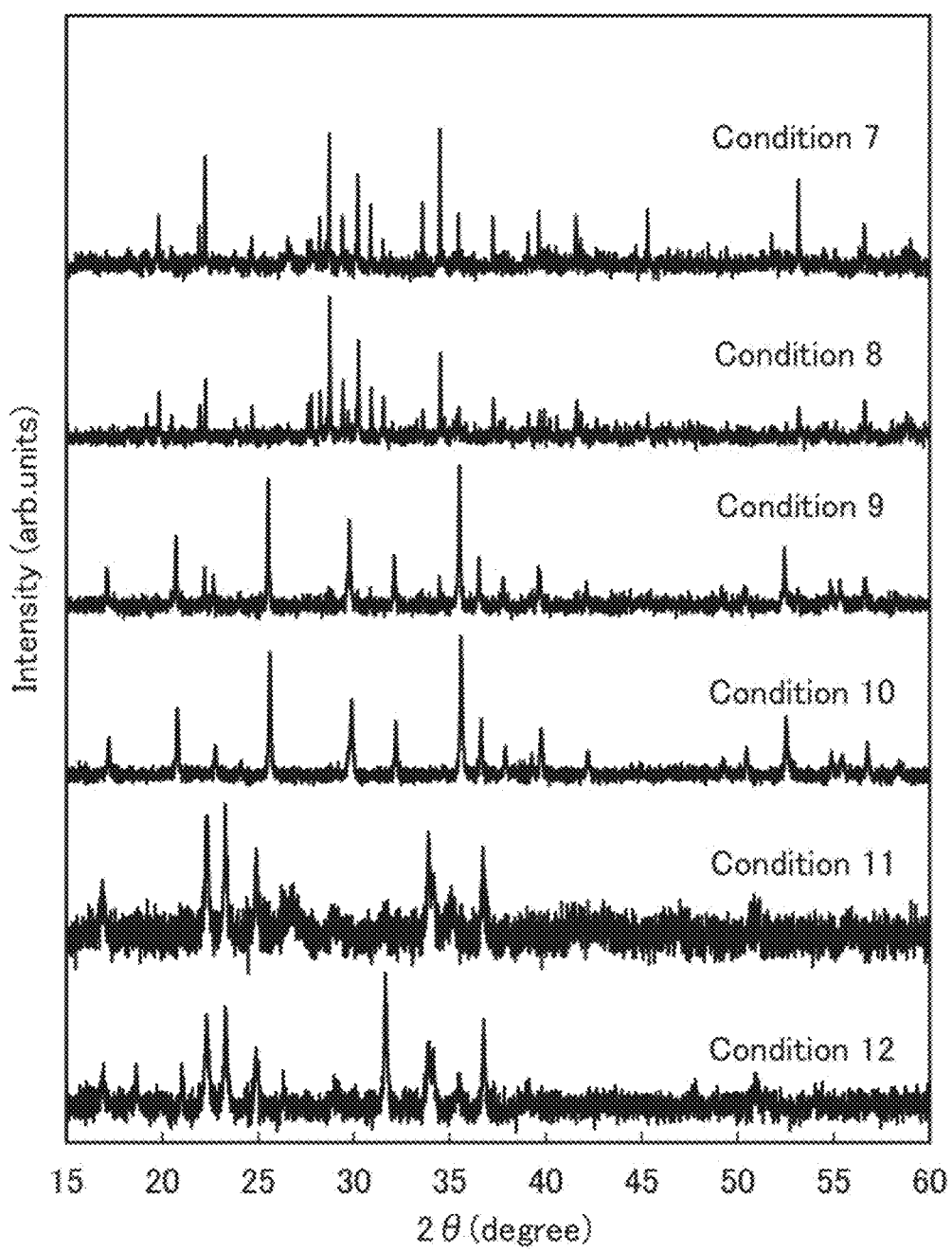
FIG. 30 shows XRD evaluation results.
Figure 31:
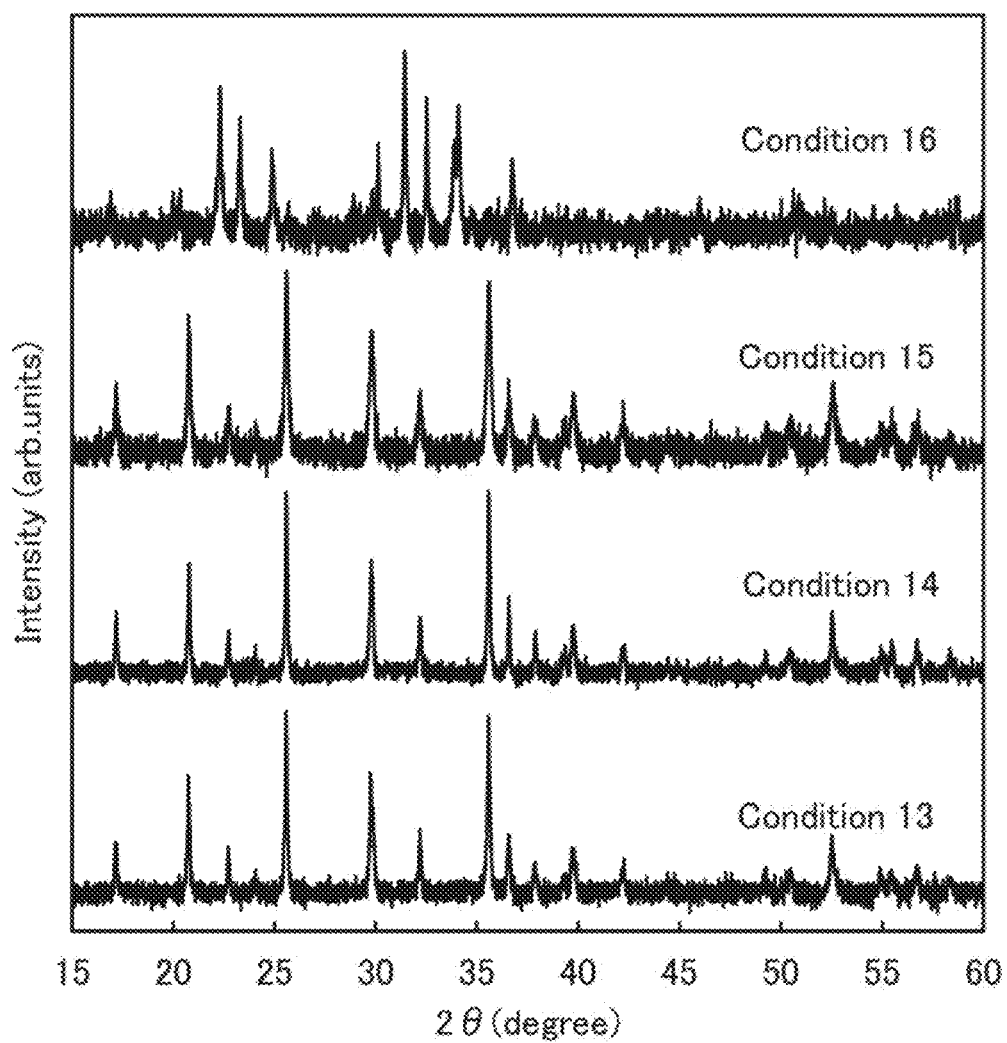
FIG. 31 shows XRD evaluation results.
Figure 32A:
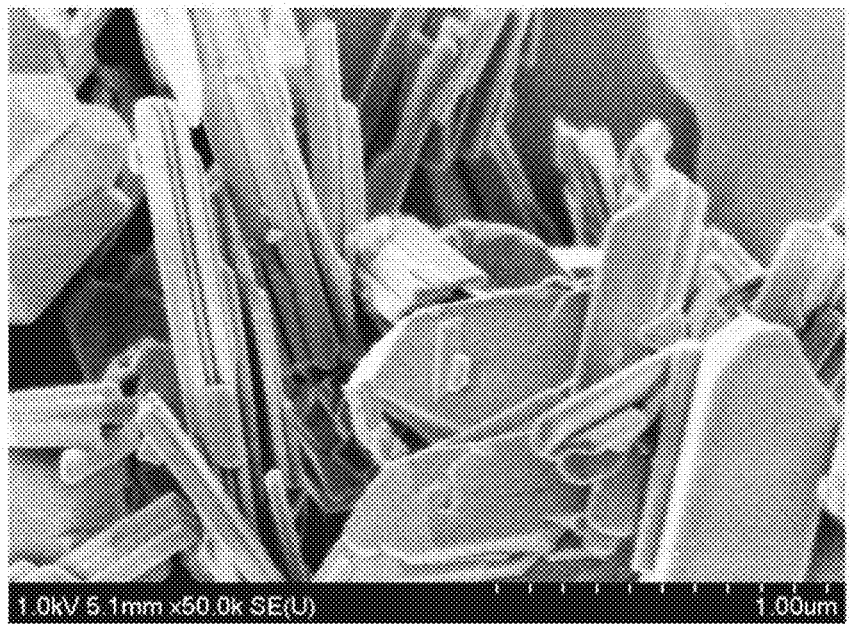
FIGS. 32A and 32B show SEM observation results.
Figure 32B:
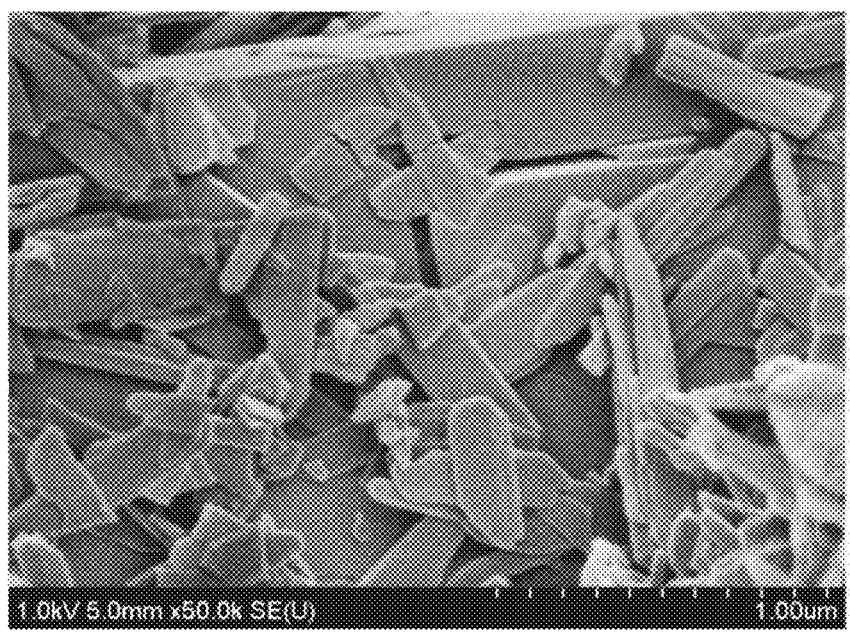

Further, the XRD measurement results of the synthetic materials A obtained under Conditions 7 to 12 are shown in FIG. 30, and the XRD measurement results of the synthetic materials A obtained under Conditions 13 to 16 are shown in FIG. 31.

In FIG. 29A, six peaks in total having maximum values at 17.1θ, 20.7θ, 25.5θ, 29.8θ, 32.1°, and 35.6θ were observed and the six peaks correspond to the peaks A to F described in Embodiment 1. It is suggested by these peaks that the synthetic material A obtained corresponds to LiFePO$_4$ of the space group Pnma according to PDF Number 01-070-6684 of the International Centre for Diffraction Data (ICDD). Note that PDF Number 01-070-6684 corresponds to Inorganic Crystal Structure Database (ICSD) Code 92198.

Accordingly, lithium iron phosphate having an olivine structure can be formed by controlling pH even at a temperature as low as 110° C. in Step S211.

The degrees of 2θ (A1 to F1) at which the peaks A to F have the maximum values were 17.149θ, 20.705°, 25.548θ, 29.835°, 32.148°, and 35.561° in FIG. 29A. Further, the half widths (A2 to F2) of the peaks were 0.103°, 0.063°, 0.087°, 0.227°, 0.144°, and 0.139°. Further, A1 to F were 17.097°, 20.716°, 25.527°, 29.773°, 32.107°, and 35.530° and A2 to F2 were 0.0983°, 0.082°, 0.081°, 0.108°, 0.087°, and 0.095° under Condition 9 in FIG. 30. Further, A1 to F1 were 17.210°, 20.767°, 25.610°, 29.876°, 32.189°, and 35.602° and A2 to F2 were 0.113°, 0.123°, 0.117°, 0.140°, 0.113°, and 0.117° under Condition 10.

In Table 2, W indicates the condition where the most strongly observed peak of the peaks observed by XRD is any of peaks A to F and X indicates the condition where the most strongly observed peak of the peaks observed by XRD is peaks other than A to F of the peaks observed by XRD.

TABLE 2

|  | Temperture at Step S211 | pH after Step S2O9 | W or X |
|---|---|---|---|
| Condition 1 | 110° C. | 2.91 | X |
| Condition 2 |  | 3.81 | X |
| Condition 3 |  | 4.75 | W |
| Condition 4 |  | 5.29 | X |
| Condition 5 |  | 6.02 | X |
| Condition 6 |  | 9.31 | X |
| Condition 7 | 120° C. | 2.78 | X |
| Condition 8 |  | 3.45 | X |
| Condition 9 |  | 4.97 | W |
| Condition 10 |  | 5.81 | W |
| Condition 11 |  | 7.76 | X |
| Condition 12 |  | 9.43 | X |
| Condition 13 | 150° C. | 3.92 | W |
| Condition 14 |  | 5.2 | W |
| Condition 15 |  | 6.5 | W |
| Condition 16 |  | 9.42 | X |

Here, through detailed analysis of FIG. 29B, slightly weak peaks are observed, suggesting the correspondence to the peaks B, C, and F. Thus, although the number of by-products is large; however, lithium iron phosphate having an olivine structure that is a target compound is also formed under Condition 2, for example.

As shown in Table 2, it is found that a condition in which lithium iron phosphate having an olivine structure can be obtained at any temperature when a pH after Step S209 is less than 5. In other words, the mixed solution is made acid, so that lithium iron phosphate having an olivine structure is easily obtained. This is probably because the potential-pH diagrams of FIG. 6 (Patent Document 1) show that when pH is high and the mixed solution is made alkaline, Fe(OH)$_2$ or the like is generated. Further, it is suggested that when a pH is lower than or equal to 3, lithium iron phosphate having an olivine structure is difficult to obtain in the case where the temperature is low. The lithium iron phosphate dissolves in acid, so that it can be considered that when pH is too low, the lithium iron phosphate is not easily generated.

Further, at 120° C., weak peaks other than those of lithium iron phosphate having an olivine structure were slightly observed in the condition where a pH was 4.97 in contrast to the condition where a pH was 5.81. Thus, it can be considered that a higher purity of crystal is obtained under the condition where a pH was 5.81.

In FIG. 28A, peaks were observed at 18.6°, 20.2, 21.0°, 26.3°, 27.4°, 30.4°, and 31.7°. It is suggested that the peaks correspond to the peaks of NH$_4$FeP$_4$·H$_2$O according to the database. Further in FIG. 28B, peaks were observed at 22.4°, 23.3°, 24.9°, 34.0°, and 36.8. It is suggested that the peaks correspond to the peaks of Li$_3$PO$_4$ according to PDF Number 00-015-0760. It can be considered that Li$_3$PO$_4$ used as the source material remains. Further, the peak observed at 31.7° may correspond to NH$_4$FePO$_4$·2O according to PDF Number 00-045-0424.

In the case where pH is higher than that in the condition of FIG. 29A, the target synthetic material A is hardly obtained and compounds such as $Li_3PO_4$ and $NH_4FePO_4 \cdot H_2O$ are generated.

Next, the by-product in the case where pH is low is discussed. Peaks were observed at 19.8°, 22.3°, 28.7°, 30.9°, 34.5°, and the like under Condition 8 in FIG. 30 and may correspond to $FePO_4 \cdot 2H_2O$ of PDF Number 00-033-0667, $Fe_5P_4O_{20}H_{10}$ of PDF Number 00-045-0121, and the like.

<SEM Observation>

Then, SEM observation of the obtained synthetic material A was performed. The synthetic material A was obtained as particles. The SEM observation was performed with S-4800 manufactured by Hitachi High-Technologies Corporation.

The SEM observation results of the synthetic materials A obtained under Conditions 1, 2, 3, 4, 5, and 6 are shown in FIGS. 32A, 32B, 33A, 33B, 34A, and 34B, respectively.

The SEM observation results of the synthetic materials A obtained under Conditions 7, 8, 9, 10, 11, and 12 are shown in FIGS. 35A, 35B, 36A, 36B, 37A, and 37B, respectively.

The SEM observation results of the synthetic materials A obtained under Conditions 13, 14, 15, and 16 are shown in FIGS. 38A, 38B, 39A, and 39B, respectively.

Figure 33A:
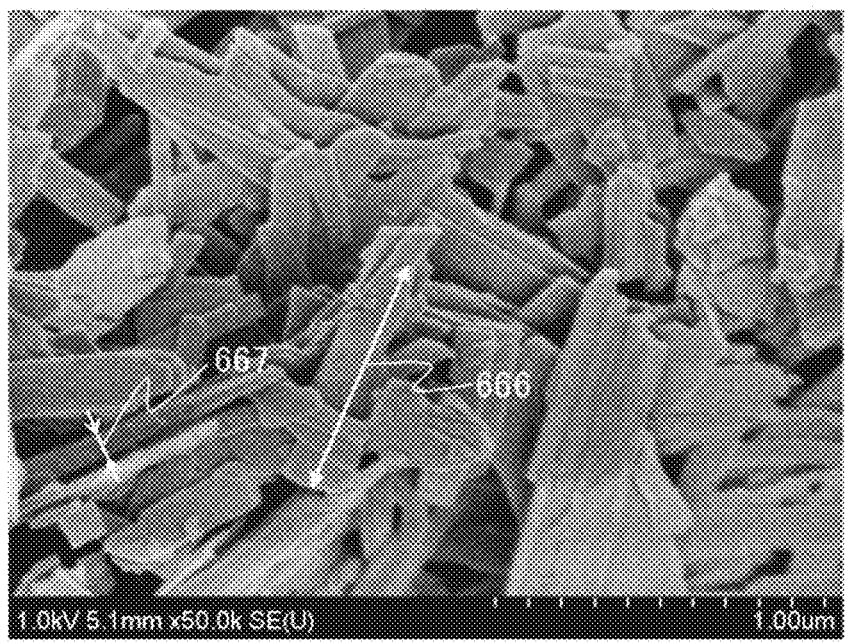
FIGS. 33A and 33B show SEM observation results.
Figure 33B:
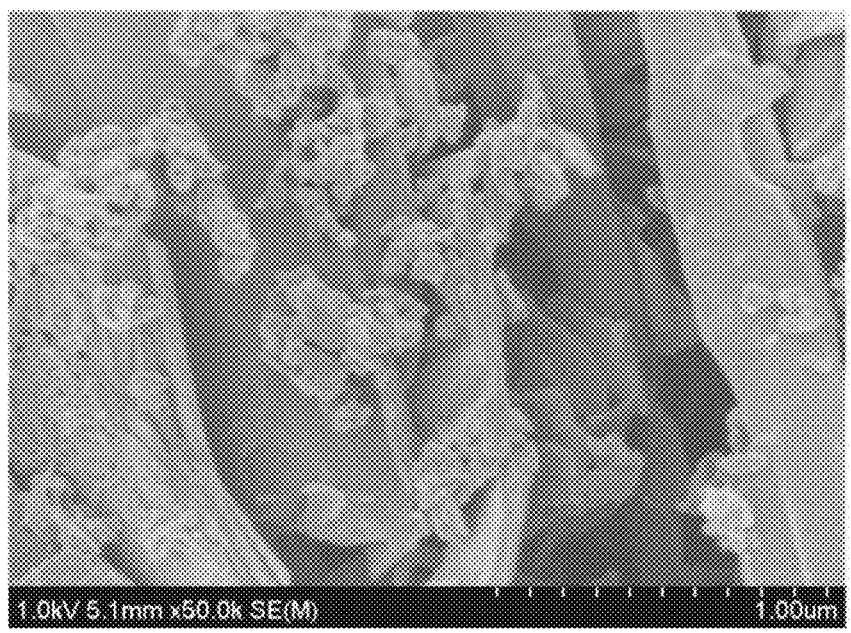
Figure 34A:
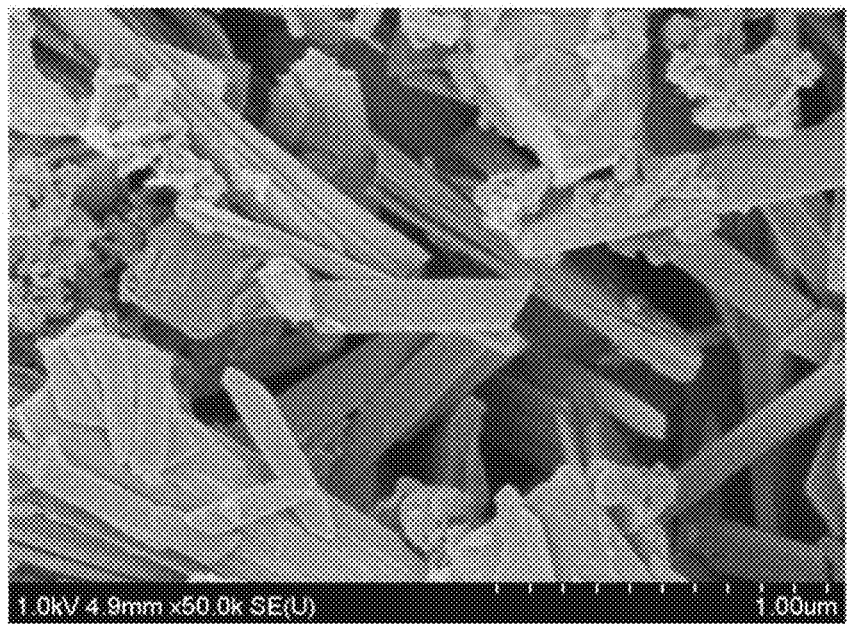
FIGS. 34A and 34B show SEM observation results.
Figure 34B:
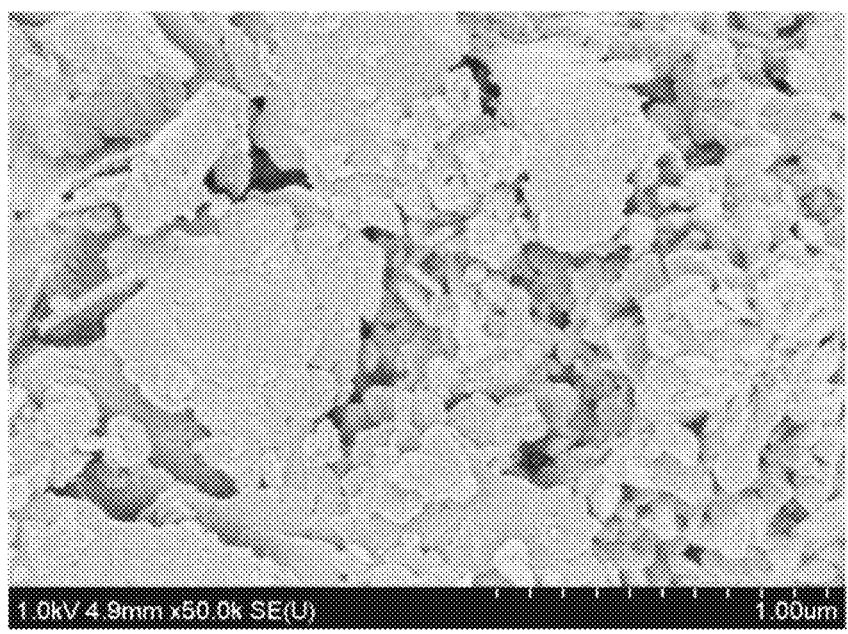
Figure 35A:
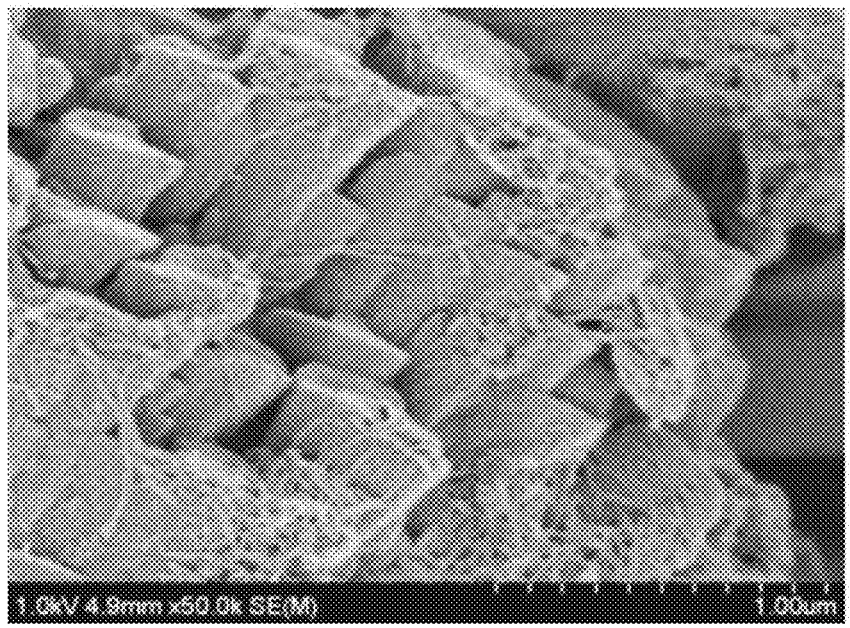
FIGS. 35A and 35B show SEM observation results.
Figure 35B:
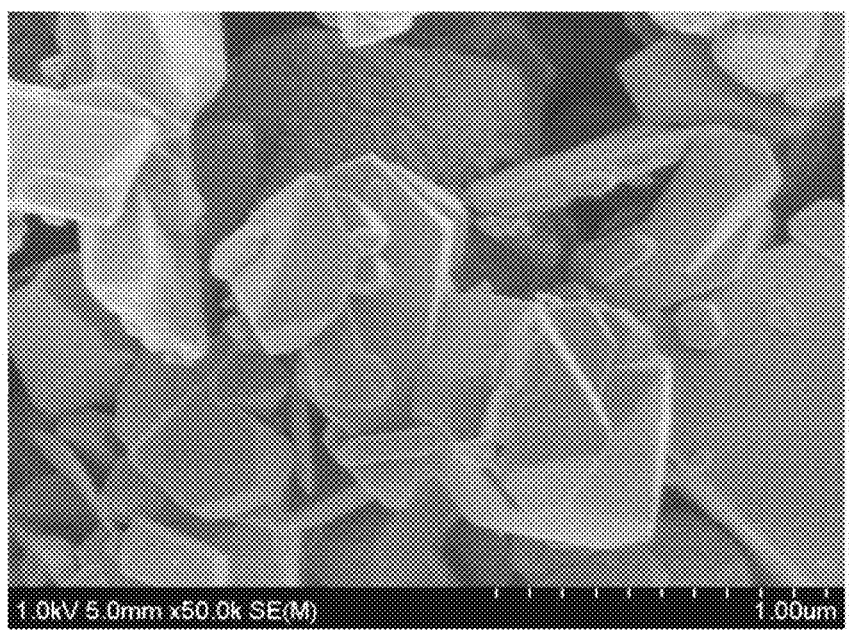
Figure 36A:
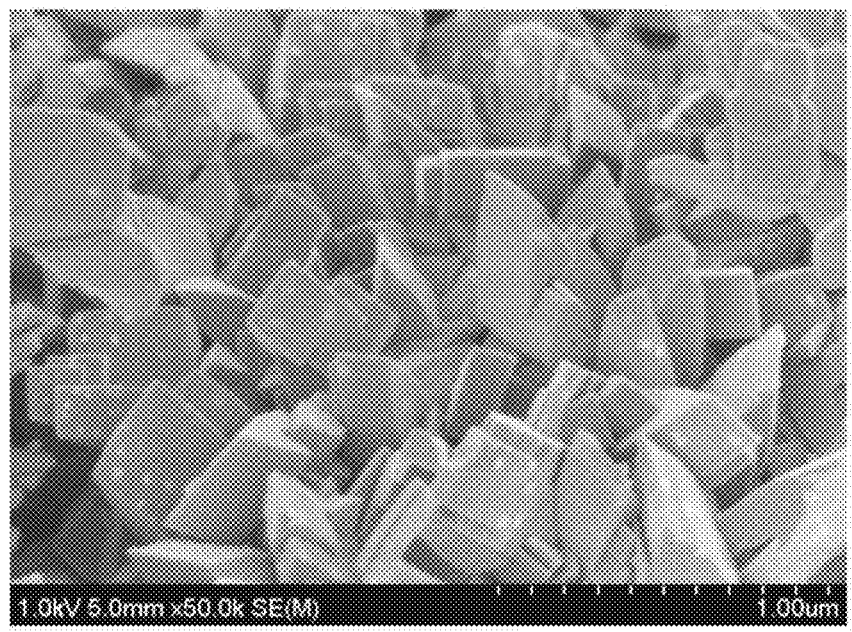
FIGS. 36A and 36B show SEM observation results.
Figure 36B:
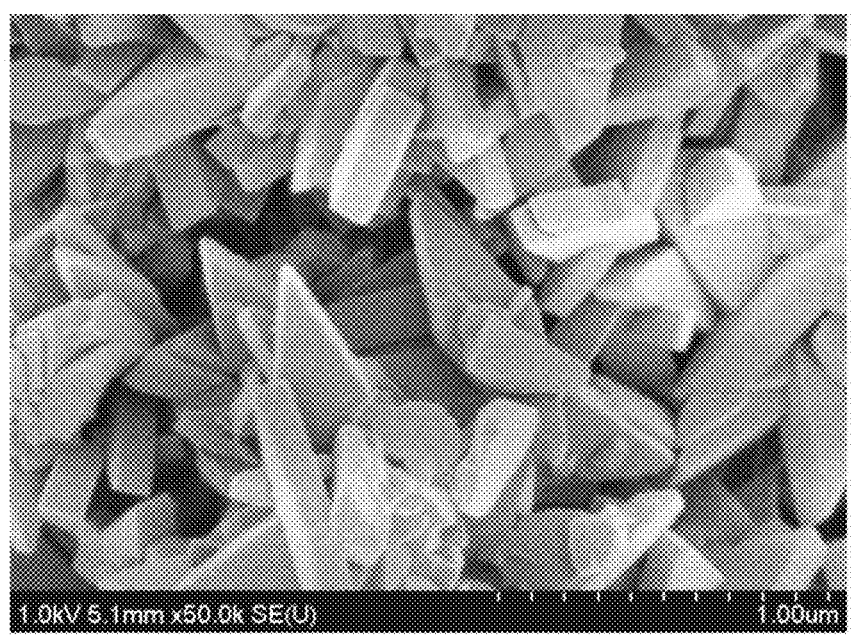
Figure 37A:
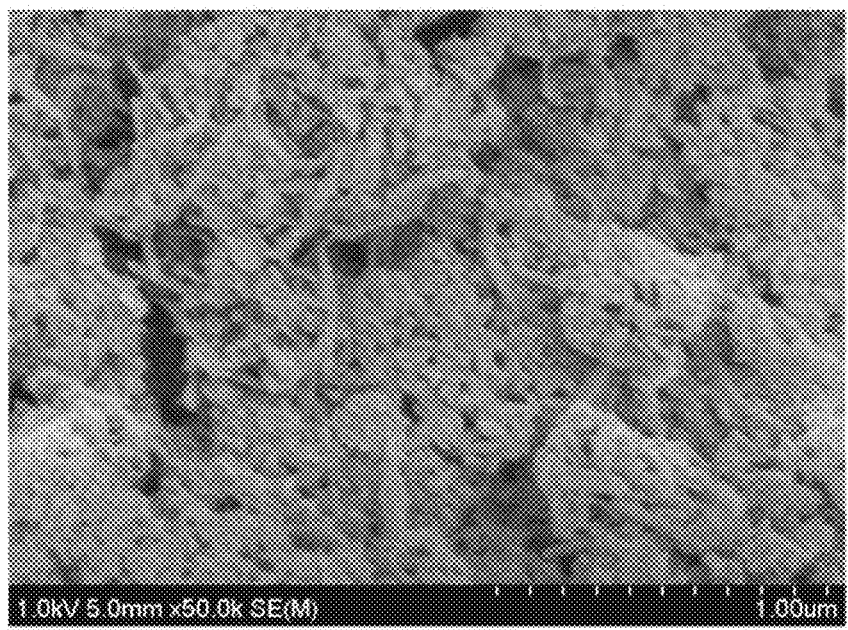
FIGS. 37A and 37B show SEM observation results.
Figure 37B:
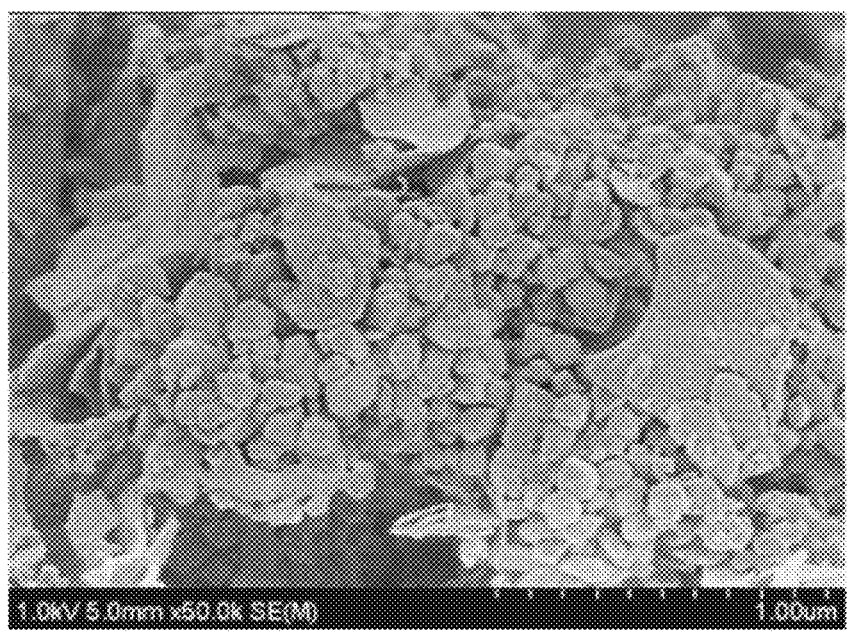
Figure 38A:
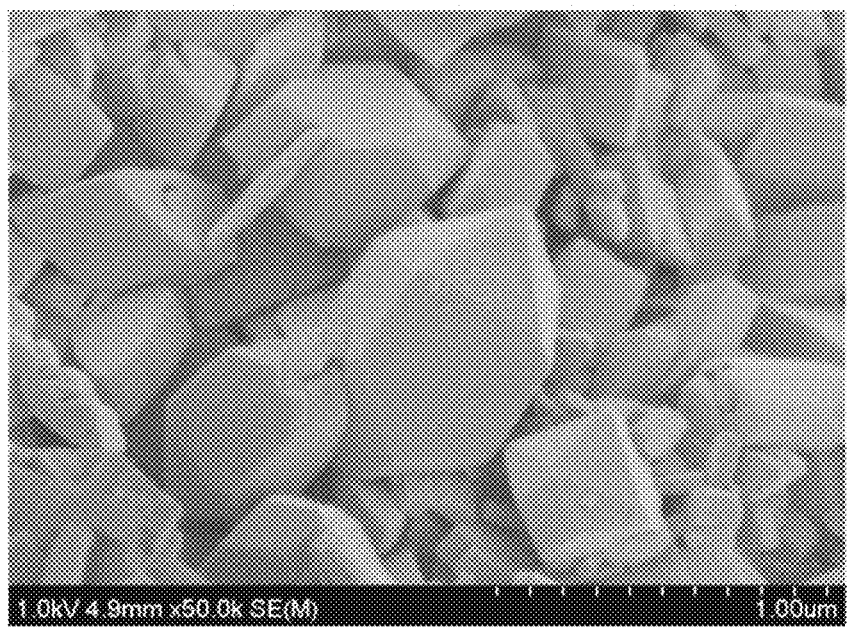
FIGS. 38A and 38B show SEM observation results.
Figure 38B:
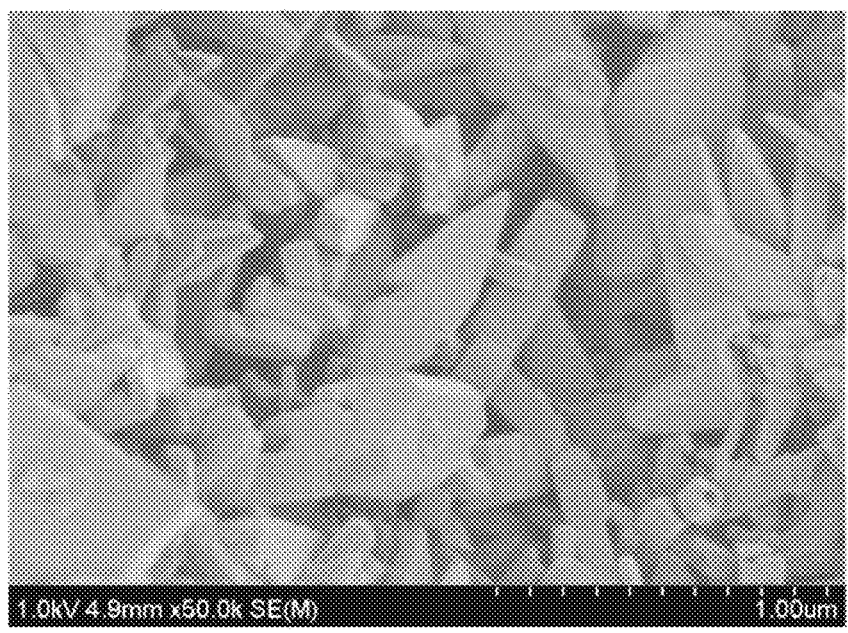
Figure 39A:
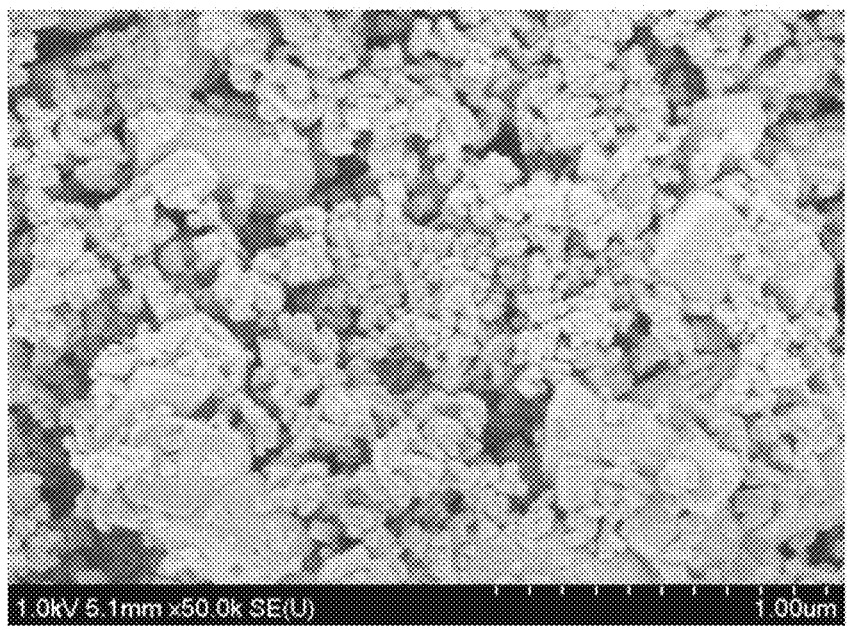
FIGS. 39A and 39B show SEM observation results.
Figure 39B:
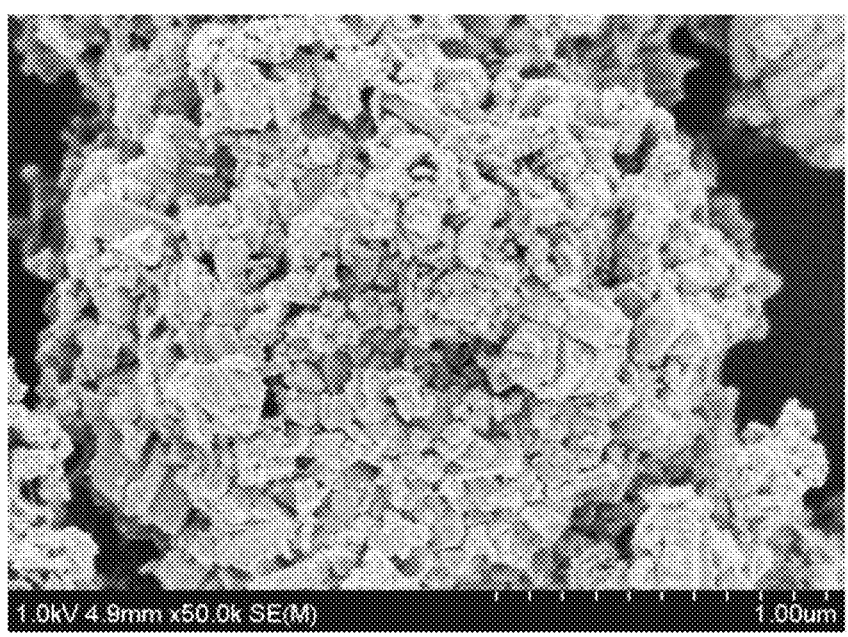

As the heating temperature is lower in Step S211, the synthetic material A that can be obtained is mom likely to be a flat-shaped particle. An example of the thickness 667 of the synthetic material A and an example of the length 666 of the synthetic material A in the case when the heating temperature was 110° C. are shown in FIG. 33A. The thickness 667 was approximately 80 nm and the length 666 was approximately 750 nm. Here, the ratio of the thickness 667 to the length 666 is called "aspect ratio" in some cases. In the example shown in FIG. 33A, the aspect ratio is low, for example, less than or equal to 0.2. FIG. 36A shows observation results of the synthetic material A in the case where the heating temperature is 120° C. In FIG. 33A, a flatter (thinner) particle can be obtained in comparison with FIG. 36A. Further, as in an example shown in FIG. 37B in the case where pH is high, it is found that a round fine particle with a grain size of approximately 100 nm and an aspect ratio close to 1 can be obtained. In the case where pH is low, an angular particle can be obtained and the lower the heating temperature is, the lower the aspect ratio is. Here, the aspect ratio is, for example, more than or equal to 0.02 and less than or equal to 0.45 or more than or equal to 0.05 and less than or equal to 0.3.

This application is based on Japanese Patent Application serial no. 2016-099458 filed with Japan Patent Office on May 18, 2016, the entire contents of which are hereby incorporated by reference.

What is claimed is:

1. A method for manufacturing a positive electrode active material comprising lithium, phosphorus, iron, and oxygen, comprising steps of:
    forming a first mixed solution by mixing a lithium compound, a phosphorus compound, and a first solvent;
    forming a second mixed solution by adjusting pH by adding a first aqueous solution to the first mixed solution;
    forming a third mixed solution by mixing an iron compound with the second mixed solution after the step of forming the second mixed solution;
    forming a fourth mixed solution by mixing the third mixed solution and a second solvent after the step of forming the third mixed solution; and
    performing heat treatment on the fourth mixed solution at a temperature higher than or equal to 100° C. and lower than or equal to 350° C.,
    wherein a pH of the fourth mixed solution is more than or equal to 3.0 and less than or equal to 6.0, and
    wherein the positive electrode active material comprises a crystal structure belonging to a space group Pnma.

2. The method for manufacturing a positive electrode active material according to claim 1, wherein the first solvent comprises water.

3. The method for manufacturing a positive electrode active material according to claim 1, wherein a pH of the third mixed solution is more than or equal to 3.5 and less than or equal to 5.0.

4. The method for manufacturing a positive electrode active material according to claim 1, wherein a highest temperature in the heat treatment is more than 100° C. and less than or equal to 119° C.

5. The method for manufacturing a positive electrode active material according to claim 1, wherein the heat treatment is performed for more than or equal to 0.5 hours and less than or equal to 24 hours.

6. The method for manufacturing a positive electrode active material according to claim 1,
    wherein the lithium compound is a lithium chloride,
    wherein the first aqueous solution is alkaline, and
    wherein a base included in the first aqueous solution is ammonia or organic amine.

7. The method for manufacturing a positive electrode active material according to claim 1, wherein the third mixed solution is formed in an air atmosphere.

8. A method for manufacturing a positive electrode active material comprising lithium, phosphorus, iron, and oxygen, comprising steps of:
    forming a first mixed solution by mixing a lithium compound, a phosphorus compound, and a first solvent;
    forming a second mixed solution by adjusting pH by adding a first aqueous solution to the first mixed solution;
    forming a third mixed solution by mixing an iron compound with the second mixed solution after the step of forming the second mixed solution;
    forming a fourth mixed solution by mixing the third mixed solution and a second solvent after the step of forming the third mixed solution; and
    performing heat treatment on the fourth mixed solution at a temperature higher than or equal to 100° C. and lower than or equal to 350° C.,
    wherein a pH of the fourth mixed solution is more than or equal to 3.0 and less than or equal to 6.0, and
    wherein the positive electrode active material comprises an olivine structure.

9. The method for manufacturing a positive electrode active material according to claim 8, wherein the first solvent comprises water.

10. The method for manufacturing a positive electrode active material according to claim 8, wherein a pH of the third mixed solution is more than or equal to 3.5 and less than or equal to 5.0.

11. The method for manufacturing a positive electrode active material according to claim 8, wherein a highest temperature in the heat treatment is more than 100° C. and less than or equal to 119° C.

12. The method for manufacturing a positive electrode active material according to claim 8, wherein the heat treatment is performed for more than or equal to 0.5 hours and less than or equal to 24 hours.

13. The method for manufacturing a positive electrode active material according to claim 8,
- wherein the lithium compound is a lithium chloride,
- wherein the first aqueous solution is alkaline, and
- wherein a base included in the first aqueous solution is ammonia or organic amine.

14. The method for manufacturing a positive electrode active material according to claim 8, wherein the third mixed solution is formed in an air atmosphere.

* * * * *